(12) United States Patent
Rodriguez et al.

(10) Patent No.: US 9,953,264 B2
(45) Date of Patent: Apr. 24, 2018

(54) SMART PROCESS MANAGEMENT

(71) Applicant: The Boeing Company, Chicago, IL (US)

(72) Inventors: Rosa María Rodriguez, Madrid (ES); Victor Pérez, Madrid (ES); Antonio González Muñoz, Granada (ES); Raúl Pérez Rodríguez, Granada (ES); Luis Castillo Vidal, Granada (ES); Lluvia Carolina Morales Reynaga, Oaxaca (MX)

(73) Assignee: THE BOEING COMPANY, Chicago, IL (US)

( * ) Notice: Subject to any disclaimer, the term of this patent is extended or adjusted under 35 U.S.C. 154(b) by 488 days.

(21) Appl. No.: 14/631,460

(22) Filed: Feb. 25, 2015

(65) Prior Publication Data
US 2015/0254564 A1 Sep. 10, 2015

(30) Foreign Application Priority Data

Mar. 4, 2014 (EP) ..................................... 14382077

(51) Int. Cl.
G06N 5/04 (2006.01)
G06Q 10/06 (2012.01)

(52) U.S. Cl.
CPC ............. *G06N 5/04* (2013.01); *G06Q 10/06* (2013.01)

(58) Field of Classification Search
CPC ............ G06N 5/04; G06N 7/02; G06N 7/005; G06Q 10/06
(Continued)

(56) References Cited

U.S. PATENT DOCUMENTS 8,776,074 B1 * 7/2014 Heisler ................. G06F 9/4881
   718/103
2005/0033600 A1 * 2/2005 Geddes ................. G06Q 10/06
   706/14

(Continued)

OTHER PUBLICATIONS

Extended European Search Report, issued by the European Patent Office in connection with European Patent Application No. 14382077.7, dated Jun. 23, 2014, 6 pages.

*Primary Examiner* — Dave Misir
(74) *Attorney, Agent, or Firm* — Hanley, Flight & Zimmerman, LLC

(57) ABSTRACT

The disclosure provides a computer-implemented method of processing information to use when producing a mission plan to accomplish a mission. The example method includes obtaining one or more mission goals to be achieved during execution of the mission and obtaining information relating to one or more resources to be used during execution of the mission. The information relating to at least one of the resources includes uncertainty. The example method also includes obtaining user preferences relating to how the uncertainty is to be handled, transforming the information relating to the one or more resources according to the user preferences to reduce the uncertainty in the information and providing the transformed information to a smart process manager, for use by the smart process manager to identify one or more of the resources that are to be used to execute at least one mission step as part of at least one mission plan to achieve the one or more mission goals and accomplish the mission.

14 Claims, 11 Drawing Sheets

Resource R1
Present Location (A)
with an
Uncertainty of
Radius $r_1$

**Destination Point
(B)** for Resource R1
in Action 1 (A1)

(58) Field of Classification Search
USPC .......................................................... 706/52
See application file for complete search history.

(56) References Cited

U.S. PATENT DOCUMENTS

| | | | | |
|---|---|---|---|---|
| 2008/0040190 | A1* | 2/2008 | Khosla | G06F 9/4881 |
| | | | | 705/7.22 |
| 2008/0313110 | A1* | 12/2008 | Kreamer | G06Q 10/06 |
| | | | | 706/12 |
| 2009/0055237 | A1* | 2/2009 | Henry | G06Q 10/06 |
| | | | | 705/7.16 |
| 2010/0153160 | A1 | 6/2010 | Bezemer et al. | |
| 2010/0305987 | A1* | 12/2010 | Correll | G06Q 10/06 |
| | | | | 705/7.28 |
| 2011/0167028 | A1* | 7/2011 | Purang | G01C 21/343 |
| | | | | 706/45 |
| 2013/0325763 | A1* | 12/2013 | Cantor | G06Q 10/0633 |
| | | | | 706/12 |
| 2014/0188767 | A1* | 7/2014 | Iyer | G06Q 10/087 |
| | | | | 706/12 |
| 2015/0242782 | A1* | 8/2015 | Onions | G06Q 10/06313 |
| | | | | 705/7.23 |

* cited by examiner

Resource R1
Present Location (A)
with an
Uncertainty of
Radius $r_1$

**Destination Point
(B)** for Resource R1
in Action 1 (A1)

SMART PROCESS MANAGEMENT

RELATED APPLICATION

This patent claims priority to European Patent Application No. 14382077.7, filed Mar. 4, 2014, and entitled "Smart Process Management," which is hereby incorporated by reference in its entirety.

FIELD OF DISCLOSURE

The present disclosure relates generally to producing a mission plan and, more particularly, to a method, which may be implemented by a computer, of processing information for use when producing a mission plan to accomplish a mission, and a corresponding system, computer program and computer-readable medium.

BACKGROUND

Planning is the process of finding a course of action that can be executed to achieve a goal. Artificial Intelligence (AI) techniques have been applied to solve real-world planning problems by assisting in smart process management, i.e. the production of a plan of action (or process) for accomplishing a mission, based upon input knowledge including knowledge of the current state of associated real-world entities. Such a plan of action (also referred to as a mission plan) typically includes one or more sequential and/or parallel sequences of actions (or mission steps) specified to be performed at particular times, such that by following the plan of action a desired end state can be approached (e.g., the mission can be at least partly accomplished).

Smart Process Management techniques (otherwise known as Artificial Intelligence Planning and Scheduling techniques) are an example of AI techniques for the solution of planning problems. A Smart Process Management technique typically involves receiving one or more mission goals and input knowledge regarding the current state of one or more resources and, using that input knowledge, the Smart Process Management technique produces a plan of action for carrying out the mission goals.

Hierarchical Task Network (HTN) Smart Process Management techniques are acknowledged as one of the most efficient of such AI techniques. However, problems exist with HTN Smart Process Management techniques because the HTN Smart Process Management techniques do not work satisfactorily when the input knowledge is imperfect or incompletely known (e.g., in so-called "real-world" situations, when the input knowledge is subject to or includes uncertainty, vagueness, lack of precision, and/or incompleteness, and actions are not completely deterministic (i.e., the result of carrying out an action cannot be completely predicted)). So-called "classical" planning techniques typically make simplifying assumptions, one of which is to consider that initial state parameters are fully determined, and another of which is to consider that after performing an action the resulting state can be predicted with complete certainty. These assumptions do not apply well to so-called "real-world" planning problems, and thus planning techniques (e.g., theory and algorithms) for planning in such "real-world" situations are more complex than classical techniques.

Although a few existing HTN techniques are able to cope somewhat with imperfect knowledge, all of those few are focused on reactive problems such as robotics, and none of them have been effective in relation to deliberative processes such as Smart Process Management. Non-HTN techniques are generally less efficient than HTN techniques and have only very limited capabilities when dealing with real-world problems. Thus, the availability of efficient AI techniques for Smart Process Management of real-world problems is currently limited.

SUMMARY

The present disclosure includes examples that address the above-identified problem(s) and associated problems. Various features or aspects of the examples are set out in the appended claims.

An example computer-implemented method of processing information to use when producing a mission plan to accomplish a mission is disclosed herein. The example method includes obtaining one or more mission goals to be achieved during execution of the mission and obtaining information relating to one or more resources to be used during execution of the mission. The information relating relates to at least one of the resources includes uncertainty. The example method also includes obtaining user preferences relating to how the uncertainty is to be handled, transforming, via a processor, the information relating to the one or more resources according to the user preferences to reduce the uncertainty in the information and providing, via the processor, the transformed information to a smart process manager, for use by the smart process manager to identify one or more of the resources that are to be used to execute at least one mission step as part of at least one mission plan to achieve the one or more mission goals and accomplish the mission.

In some examples, the method includes identifying, based on the transformed information, the one or more of the resources that are to be used in at least one mission step as part of at least one mission plan to accomplish the one or more mission goals, producing, based on the identified resources, at least one mission plan to accomplish the one or more mission goals, and providing the at least one mission plan to a user.

In some examples, the information relating to each resource includes at least one of an execution time indicating a time for the respective resource to execute its part of the mission, an execution cost indicating a cost for the respective resource to execute its part of the mission, an availability score indicating a level of availability of the respective resource to execute its part of the mission or an efficiency score indicating a level of efficiency of the respective resource when executing its part of the mission.

In some examples, obtaining the user preferences includes obtaining one or more threshold values, each threshold value relating to one of the execution cost, the execution time, the efficiency score or the availability score, and transforming the information includes at least one of: if a cost threshold value is obtained, transforming the execution cost for each resource to an absolute indication of cost corresponding to whether or not the respective resource is costly by comparing the execution cost to the cost threshold value; if a time threshold value is obtained, transforming the execution time for each resource to an absolute indication of time corresponding to whether the respective resource is fast or slow by comparing the execution time to the time threshold value; if an availability threshold value is obtained, transforming the availability score for each resource to an absolute indication of availability corresponding to whether or not the respective resource is available by comparing the availability score to the availability threshold value; or if an efficiency threshold value is obtained, transforming the efficiency score for each resource to an absolute indication of efficiency corresponding to whether or not the respective resource is efficient or inefficient by comparing the efficiency score to the efficiency threshold value. In some such examples, the smart process manager is to identify as useable, to execute the at least one mission step as part of the at least one mission plan, a resource having at least one of an absolute indication of availability indicating that the resource is available; an absolute indication of efficiency indicating that the resource is efficient, an absolute indication of execution cost indicating that the resource is not costly, or an absolute indication of execution time indicating that the resource is not slow.

In some examples, obtaining the user preferences includes obtaining weighting factors to be applied to one or more of the execution time score, the execution cost score, the availability score or the efficiency score, and transforming the information relating to the one or more resources includes aggregating the execution time, the execution cost, the availability score and the efficiency score for each resource as a weighted combination using the weighting factors to provide an overall resource score for each resource, and the transformed information includes the overall resource score for each resource. In some such examples, providing the transformed information includes providing to the smart process manager the transformed information of those resources that have an overall resource score greater than a resource score threshold value, such that the resources having an overall resource score greater than the resource score threshold are considered by the smart process manager for inclusion in the at least one mission plan. In some examples, the method includes, for each of the at least one mission plan, totaling the resource scores for each of the resources used in the respective mission plan to produce a respective mission score associated with the respective mission plan. In some such examples, the method includes providing the at least one mission plan to a user, ranked in an order based upon the associated mission score for each mission plan. In some examples, those mission plans having an associated mission score greater than a mission score threshold value are provided to the user.

In some examples, for each resource, the information relating to the respective resource includes an assumed location of the respective resource, and obtaining the information relating to the respective resource includes deriving at least one of an execution time or an execution cost for the respective resource using the assumed location of the respective resource. In some such examples, each assumed location has an associated radius of uncertainty, and obtaining the user preferences includes obtaining from the user an indication as to the optimism to be associated with the assumed locations. In such an example, the deriving is further based upon the indicated optimism and the respective radius of uncertainty associated with the assumed location of the respective resource. In some examples, for each resource, if indicated as most optimistic, the calculating includes calculating a minimum possible execution time and/or a minimum possible execution cost, based on the assumed location of the respective resource, the associated radius of uncertainty of the respective resource, and a location of a target involved in the mission, and if indicated as least optimistic, the calculating includes calculating a maximum possible execution time and/or a maximum possible execution cost, based on the assumed location of the respective location, the associated radius of uncertainty of the respective resource, and a location of a target involved in the mission. In some examples, the method includes executing a mission step of the at least one mission plan, updating at least one of the assumed location and the radius of uncertainty for at least one resource used in the executed mission step, and providing the updated information to the smart process manager to produce a further mission step and/or an updated mission plan based on the updated assumed location and/or radius of uncertainty of the assumed location.

In some examples, the method includes identifying the obtained information relating to at least one of the resources that includes uncertainty. In such an example, the transforming includes transforming the identified obtained information.

An example system is disclosed herein that includes a processor and a memory, the memory storing instructions that, when executed, cause the processor to obtain one or more mission goals to be achieved during execution of a mission and obtain information relating to one or more resources to be used during execution of the mission. The information relating to at least one of the resources includes uncertainty. The instructions, when executed, also cause the process to obtain user preferences relating to how the uncertainty is to be handled, transform the information relating to the one or more resources according to the user preferences to reduce the uncertainty in the information and provide the transformed information to a smart process manager, for use by the smart process manager to identify one or more of the resources that are to be used to execute at least one mission step as part of at least one mission plan to achieve the one or more mission goals and accomplish the mission.

In some examples, the instructions, when executed, cause the processor to identify, based on the transformed information, the one or more of the resources that may be used in at least one mission step as part of at least one mission plan to accomplish the one or more mission goals, produce, based on the identified resources, at least one mission plan to accomplish the one or more mission goals, and provide the at least one mission plan to a user.

In some examples, the information relating to each resource includes at least one of an execution time score indicating a time for the respective resource to execute its part of the mission, an execution cost score indicating a cost for the respective resource to execute its part of the mission, an availability score indicating a level of availability of the respective resource to execute its part of the mission or an efficiency score indicating a level of efficiency of the respective resource when executing its part of the mission.

In some examples, the processor is to obtain the user preferences by obtaining one or more threshold values, each threshold value relating to one of the execution cost score, the execution time score, the efficiency score or the availability score, and transform the information by at least one of: if a cost threshold value is obtained, transforming the execution cost score for each resource to an absolute indication of cost having two possible values corresponding to whether or not the respective resource is costly by comparing the execution cost score to the cost threshold value; if a time threshold value is obtained, transforming the execution time score for each resource to an absolute indication of time having two possible values corresponding to whether the respective resource is fast or slow by comparing the execution time score to the time threshold value; if an availability threshold value is obtained, transforming the availability score for each resource to an absolute indication of availability having two possible values corresponding to whether or not the respective resource is available by comparing the availability score to the availability threshold value; or if an efficiency threshold value is obtained, transforming the efficiency score for each resource to an absolute indication of efficiency having two possible values corresponding to whether or not the respective resource is efficient or inefficient by comparing the efficiency score to the efficiency threshold value. In some such examples, the smart process manager is to identify as useable, to execute the at least one mission step as part of the at least one mission plan, a resource having at least one of an absolute indication of availability indicating that the resource is available, an absolute indication of efficiency indicating that the resource is efficient, an absolute indication of execution cost indicating that the resource is not costly, or an absolute indication of execution time indicating that the resource is not slow.

In some examples, the processor is to obtain the user preferences by obtaining weighting factors to be applied to at least one of the execution time score, the execution cost score, the availability score or the efficiency score, and transform the information relating to the one or more resources by aggregating the execution time score, the execution cost score, the availability score and the efficiency score for each resource as a weighted combination using the weighting factors to provide an overall resource score for each resource, and the transformed information includes the overall resource score for each resource.

Disclosed herein is a computer program that includes instructions which, when executed, cause a processor to carry out any of the methods described herein.

Disclosed herein is a computer-readable medium storing instructions which, when executed, cause a processor to carry out any of the methods described herein.

DESCRIPTION

A Hierarchical Task Network Smart Process Manager (HTN-SPM, also referred to as an HTN Intelligent Planner/Scheduler) is, by way of example, a software component that typically receives (a) one or more mission goals, and (b) input knowledge regarding the current state of one or more resources, and, using that input knowledge, produces a plan of action or mission plan for carrying out the mission goals and, thus, accomplishing the mission.

Known HTN-SPMs do not satisfactorily deal with imperfect input knowledge. The imperfections included in input knowledge used by an SPM for producing a mission plan may include, for example, imperfect knowledge about the availability of resources involved in the plan, imperfect knowledge about the location of the resources and/or imperfect knowledge about the efficiency of the resources within an effect-oriented framework. Such imperfections may be referred to as "uncertainty" (e.g., uncertainty as to the accuracy and/or precision of the input knowledge) and may be represented in terms of measures of possibility, probability, belief and plausibility.

The examples disclosed herein enable an HTN-SPM to be successfully used with imperfect input knowledge (e.g., input knowledge that includes uncertainty, also referred to as "uncertain" input knowledge). This is achieved by transforming the uncertain input knowledge to input knowledge that is deemed to be completely known (i.e., certain), via specific mathematical operations, and supplying the transformed input knowledge to the HTN-SPM, thereby allowing uncertain knowledge to be used as a source of input knowledge to the HTN-SPM. Therefore, those types of existing HTN-SPMs, which were previously unable to satisfactorily deal with uncertain input knowledge, are enabled to be used with uncertain input knowledge and, thus, the applicability of HTN-SPM techniques is widened. As a result, the efficiency of production of mission plans is improved due to the availability for use of HTN-SPMs (which are generally more efficient than non-HTN-SPMs) in the above-mentioned situations, for example, where use of HTN-SPMs was not previously practical.

Figure 1:
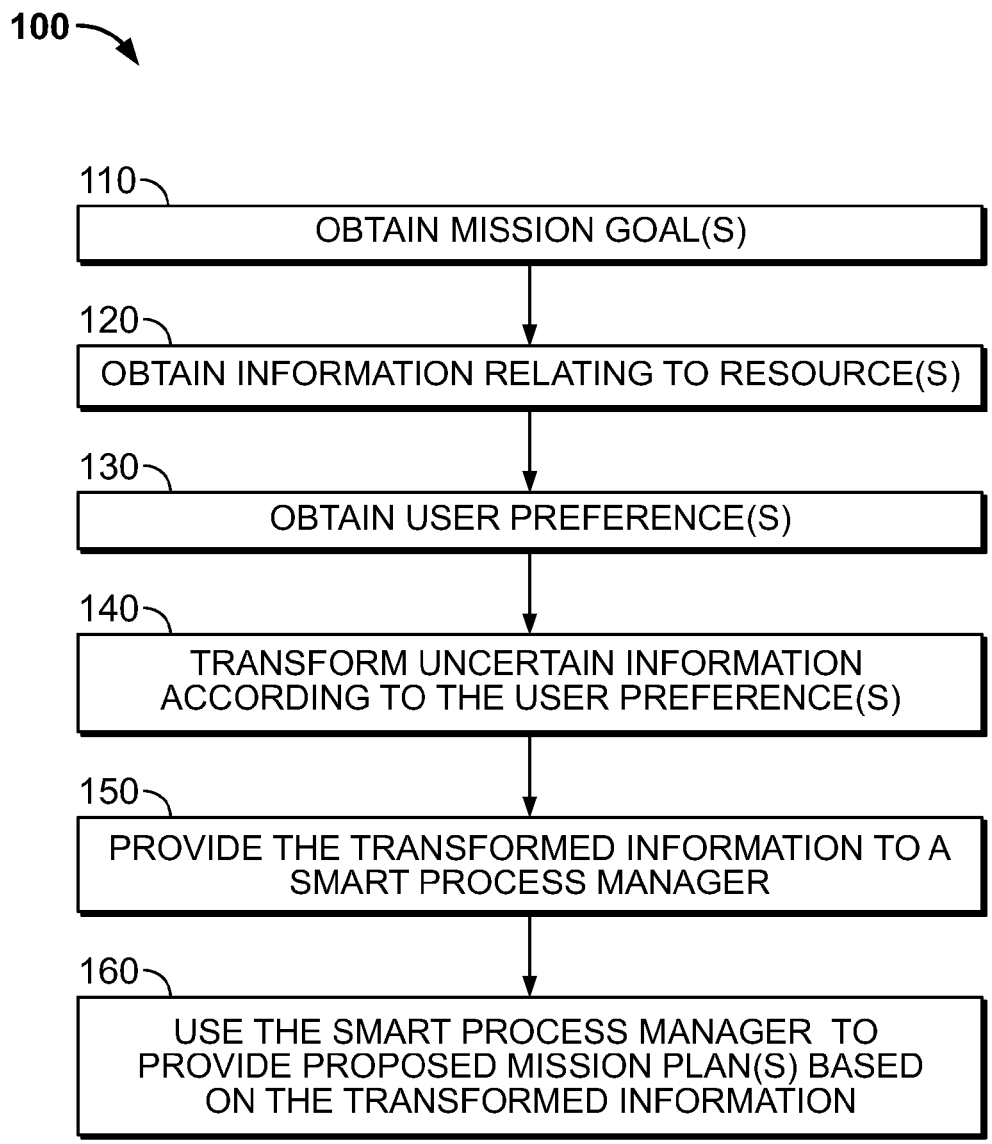
FIG. 1 is a flow chart representing an example method of processing information for use when producing a mission plan to accomplish a mission.

FIG. 1 illustrates an example method 100 for producing a mission plan to accomplish a mission. The example method 100 includes obtaining one or more mission goals to be achieved during execution of the mission (block 110). For example, a user might specify a mission goal that an item is to be fetched from a first location and taken to a second location. The nature of the item might further imply certain properties of a resource to be used in carrying out the mission. For example, if the item is large, then a resource such as a transporter vehicle might implicitly require a certain carrying capacity.

Figure 13:
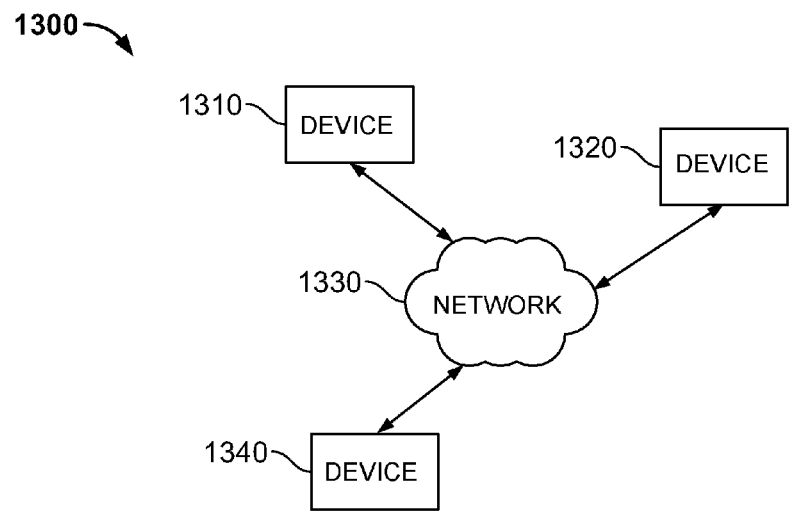
FIG. 13 is an example computer system that can be employed to implement any of the example method(s) of FIGS. 1-5, 7 and 8.
Figure 14:
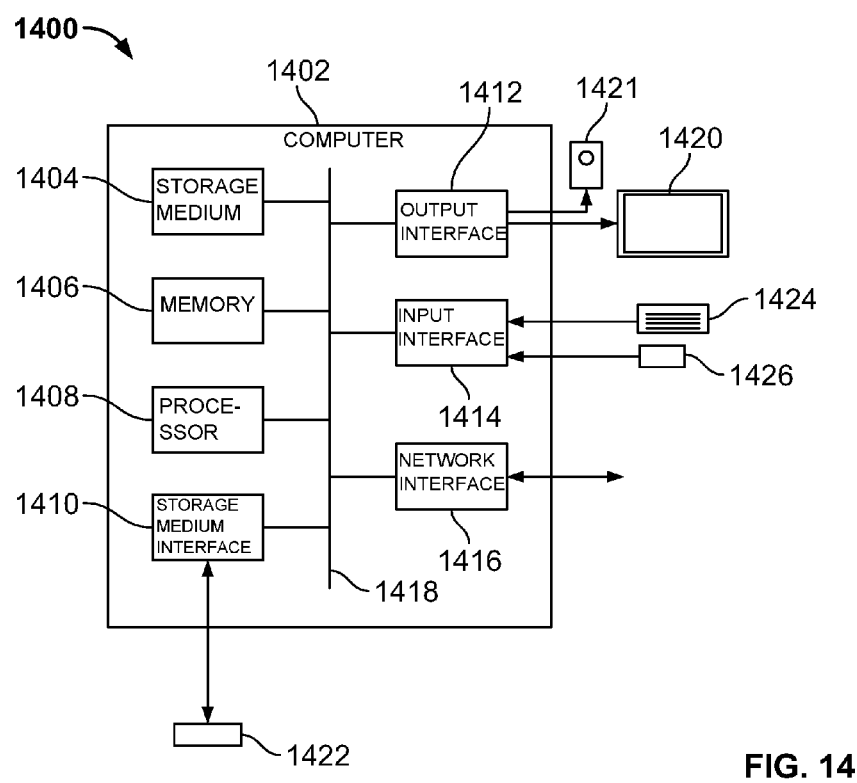
FIG. 14 is an example system or computing device capable of implementing any of the examples disclosed herein.

The example method 100 of FIG. 1 includes obtaining information relating to one or more resources that may be used during execution of the mission (block 120). The information may be obtained, for example, via a user interface, storage device or network interface as disclosed herein for the mission goals. In some examples, such information relating to each resource may include one or more "attribute scores" each relating to an attribute of the respective resource. For example, an execution time score may indicate the relative speed of operation of the respective resource when compared to a reference speed (e.g., the speed of a nominal reference resource, which may be for example an averagely performing resource) and, thus, the execution time score provides an indication of the time for the respective resource to execute a part of the mission. Similarly, the information relating to each resource may additionally or alternatively include one or more of the following other attribute scores: an execution cost score that provides an indication of the cost for the respective resource to execute a part of the mission (e.g., relative to a reference cost (e.g., a cost for a reference resource to carry out the part of the mission or a part of a reference mission)); an availability score that provides an indication of the availability of the respective resource to execute a part of the mission; or an efficiency score that provides an indication of the efficiency of the respective resource when executing a part of the mission. Execution cost may be, for example, an economic cost of operating the resource (e.g., the cost expressed in US Dollars or Euros, including fuel cost and staffing salaries) when carrying out a nominal task. Execution time may be, for example, the time in hours for the resource to complete a nominal task. Efficiency and availability may be, for example, represented as a number in an interval between 0 and 1, where 1 represents "efficient" or "available", and 0 represents "inefficient" and "unavailable." For example, 0.7 may represent "apparently available but with no full guarantee." In some examples, the execution cost and execution time scores are normalized to an interval between 0 and 1, so that the execution cost and execution time scores carry equal weight compared with the efficiency and availability scores. In an example hardware/software implementation illustrated in FIG. 12, the attribute scores and mission goals are obtained from a storage device, such as the Resource Attribute and Mission Goals Store 1210, although in other examples the attribute scores and mission goals may be obtained over a network or directly from user input (e.g., via a User Interface 1220). In some examples, the method of FIG. 1 may be implemented using a computer 1310, 1402 as illustrated in FIGS. 13 and 14, in which, for example, the attribute scores and/or mission goals may be obtained via a user input interface 1414, or from a storage device such as a storage medium 1404, or via a network interface such as a network interface 1416. The example implementations of the methods disclosed herein with reference to FIGS. 1-5, 7 and 8 are further discussed herein. However, it will be appreciated that any suitable hardware and/or software arrangement may be used to implement the methods disclosed herein, thus many variations on the example implementations illustrated in FIGS. 12-14 are possible.

Figure 6:
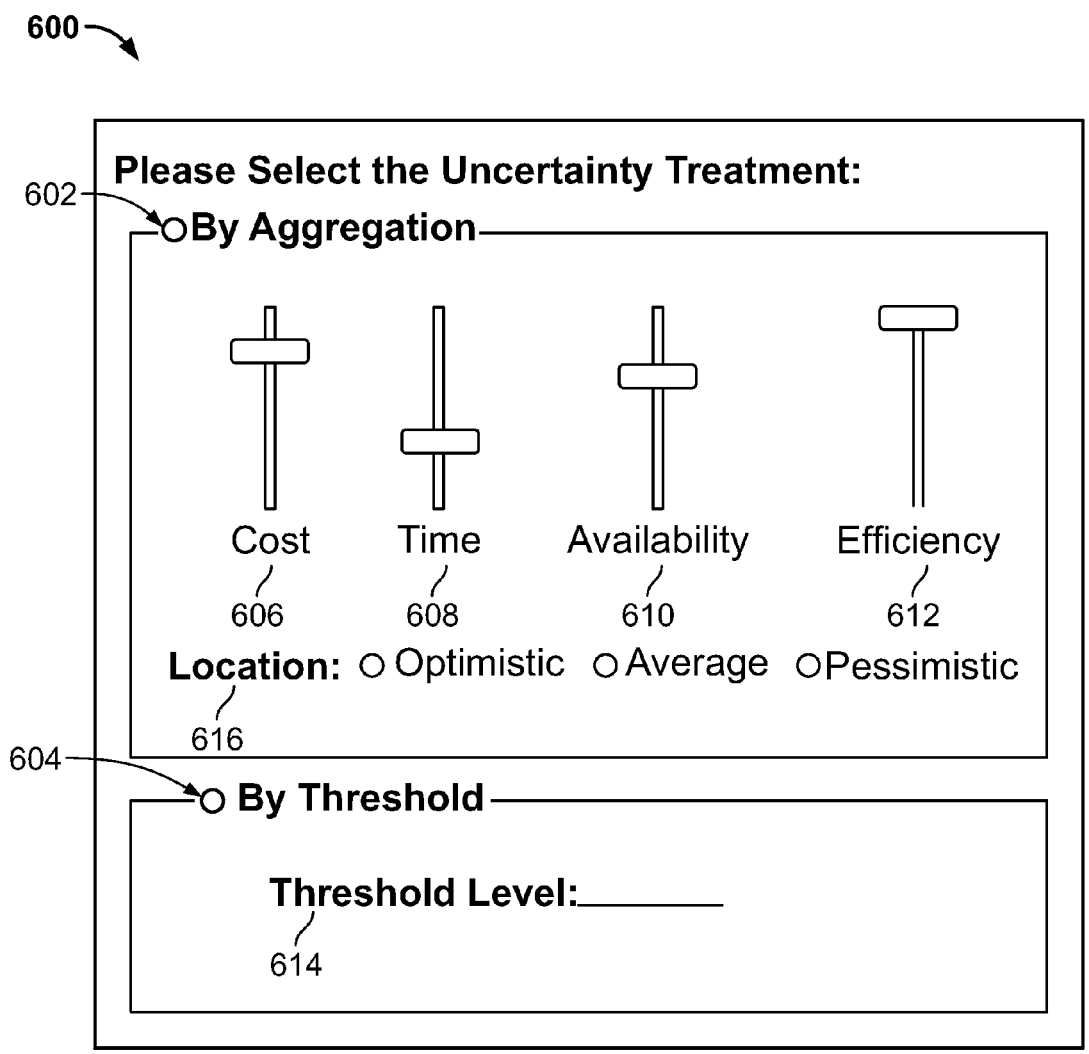
FIG. 6 is an example Graphical User Interface (GUI) for obtaining user preference(s), such as input weighting factors and/or threshold value(s), and which may be used in any of the example methods of FIGS. 1-5.

The example method 100 includes obtaining at least one user preference as to how the aforementioned uncertainty in the information relating to the resources (e.g., which includes the attribute scores) is to be handled (block 130). FIG. 6 illustrates an example Graphical User Interface (GUI) 600 for a computer that enables a user to enter a preference as to whether a "threshold" method (e.g., as disclosed herein with reference to FIG. 2) should be used to handle the uncertainty, or whether an "aggregation" method (e.g., as disclosed herein with reference to FIG. 3) should be used, or a combination of both methods should be used. In FIG. 6, which illustrates the example GUI 600 for use by a user to enter their preferences, buttons 602, 604 are selectable (e.g., clickable) buttons that enable a user to select either the "threshold" method or the "aggregation" method by any suitable method, such as a mouse click or touch screen activation. The GUI 600 of FIG. 6 is illustrated as the User Interface 1220 in the example system block diagram of FIG. 12.

Figure 12:
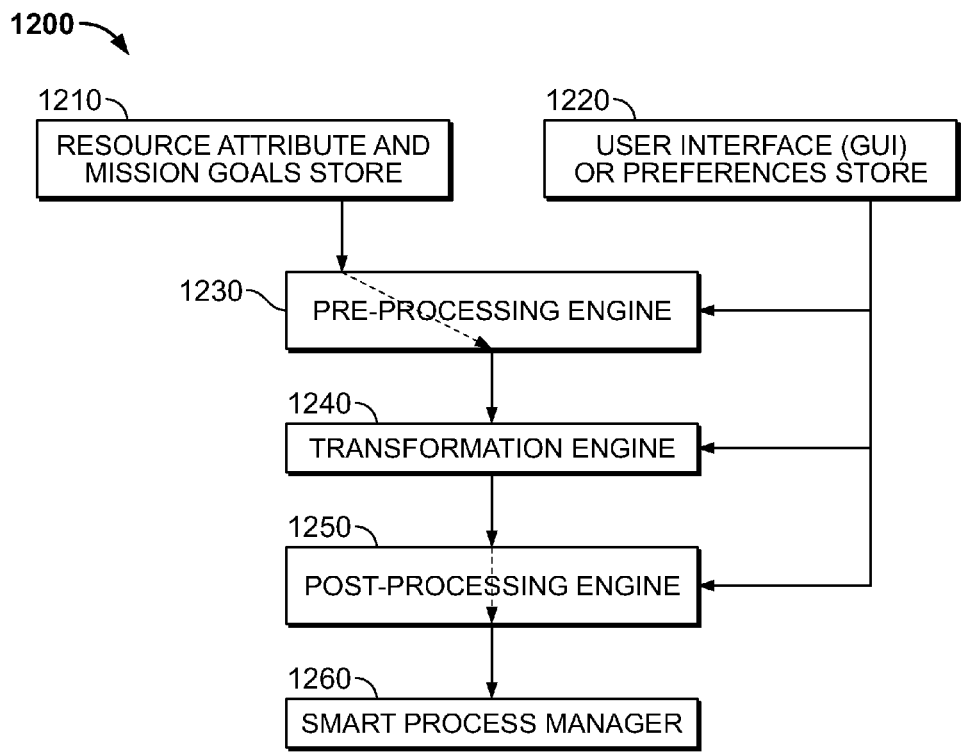
FIG. 12 illustrates a number of example modules, which may be implemented in software or hardware, included in an example system arranged to carry out any of the example method(s) of FIGS. 1-5, 7 and 8.

The example method 100 of FIG. 1 includes transforming the information relating to the one or more resources (e.g., by a Transformation Engine 1240 as illustrated in FIG. 12), according to the user preferences, to reduce the uncertainty in the information (block 140). For example, if the obtained user preferences specify that uncertainty should be handled by applying the "threshold" method (e.g., as disclosed herein with reference to FIG. 2), then the information is transformed using the "threshold" method, thereby reducing the uncertainty in the information. Alternatively, if the obtained user preferences specify that the "aggregation" method (e.g., as disclosed herein with reference to FIG. 3) should be used, then the information is transformed using the "aggregation" method, thereby deriving information with reduced uncertainty. Thus, transformed information is derived that may be used by a smart process manager (SPM) to select resources for use in producing a mission plan. In some examples, a combination of the two methods may be specified by the user, and/or other transformation methods described herein may be applied.

The example method 100 of FIG. 1 includes providing the transformed information relating to the one or more resources to an SPM (block 150) (e.g., an SPM 1260 as illustrated in FIG. 12). In some examples, the SPM (e.g., the SPM 1260) is an HTN-SPM.

In some examples, the SPM (e.g., the SPM 1260 of FIG. 12) operates using the transformed information relating to the one or more resources and the mission goals to produce at least one proposed mission plan for accomplishing the mission goals (block 160). The provision to the SPM of transformed information relating to the one or more resources, which transformed information includes reduced or eliminated uncertainty, improves the compatibility of the information with HTN-SPMs. From the transformed information and mission goals, the SPM is able to determine which of the resources (to which the information relates) is suitable (or preferable) for including in the at least one mission plan to accomplish the mission goals. The SPM then prepares the at least one mission plan using at least one of the resources that are determined to be suitable or preferable. The at least one mission plan is then, in some examples, presented to a user for selection (e.g., via the User Interface 1220 of FIG. 12). The selected mission plan may then be executed to achieve the mission goals and thereby accomplish the mission.

Figure 2:
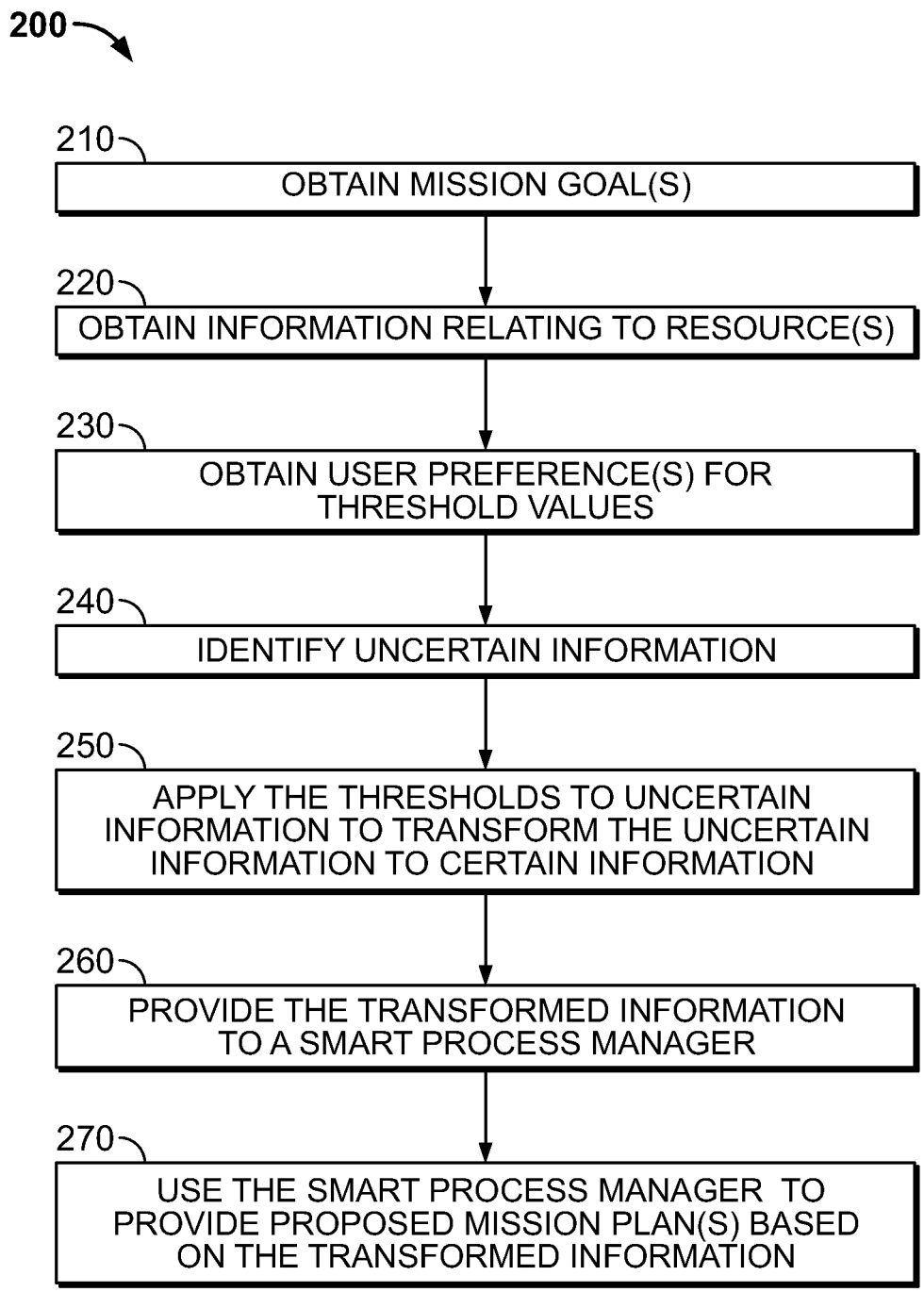
FIG. 2 is a flow chart representing another example method of processing information for use when producing a mission plan to accomplish a mission. In the example method of FIG. 2, a threshold is applied to uncertain input knowledge to reduce uncertainty in the input knowledge.

FIG. 2 illustrates an example method 200, which may be referred to as the "threshold method." The example method 200 includes obtaining mission goals (block 210) and obtaining information relating to one or more resources that may be used during execution of the mission (block 220), which may be performed similar to blocks 110, 120 of the example method 100 of FIG. 1. The example method 200 of FIG. 2 includes obtaining user preferences for a threshold value to be applied to each of the execution time score, the execution cost score, the availability score, and the efficiency score (block 230). FIG. 6 illustrates the example GUI 600 that may be used to enable a user to select the "threshold" method (e.g., using the "By threshold" button 604) and to allow the user to enter the threshold value (e.g., using a "Threshold level" text entry field 614). Threshold values may be given, for example, as percentages of a maximum value, or as an absolute value. Although in the example illustrated in FIG. 6, a single threshold value is entered by the user and applied in common to all of the execution time score, the execution cost score, the availability score, and the efficiency score, in other examples multiple threshold values (e.g., separate respective threshold values corresponding to each of the attribute scores) may be entered by the user and applied to respective subsets of the attribute scores. In the illustrated example of FIG. 6, the text entry field 614 is used to enable a user to enter his or her preferences. However, in other examples, other types of input means may be used or the threshold value(s) may be stored in memory or retrieved across a network.

In some examples, the method 200 includes identifying uncertain information (block 240), which is discussed in further detail herein.

The example method 200 includes a "thresholding" operation that is carried out on each score by comparing each score to its applicable threshold value to transform the score to an absolute (e.g., a certain) indication of whether or not the corresponding resource possesses the property indicated by the score (block 250). For example, for the efficiency score, if the result of the comparison of the efficiency score with the applicable threshold is that the efficiency score is greater than the respective threshold then the resource is deemed to be efficient, otherwise the resource is deemed to be inefficient. Similarly, for the availability score, if the result of the comparison is that the availability score is greater than its respective threshold then the resource is deemed to be available, otherwise the resource is deemed to be unavailable. A similar comparison is made between the execution cost score and its respective threshold, and between the execution time score and its respective threshold. The results of the comparisons are absolute indications of whether or not the resource is costly and whether or not the resource is slow, respectively. In this manner, probability distributions and possibility distributions for multi-valued ranges are transformed into Boolean facts represented by 0 or 1 values. These facts, when passed to the SPM, are treated as known, classical facts and, thus, the SPM is not required to deal with uncertainty.

An example situation is shown in Table 1 below, where the availability of a rescue team is considered. The availability score for the rescue team resource is transformed using the "threshold" method (e.g., FIG. 2) to an absolute indication of availability of the rescue team. In the example, the availability score is 0.3, and a user has set a corresponding threshold value of 0.7. Because the availability score is below the threshold value, the absolute indication of availability given to the rescue team resource is 0, indicating that the rescue team resource is not available. It can be seen that, in effect, by setting a threshold the user can set the level of uncertainty that the user is willing to accept. For example, a user may initially decide that it is convenient to use resources with a high degree of availability." However, if, having set the threshold(s) accordingly, the SPM is unable to produce a plan (e.g., due to none of the resources meeting the set criteria), then the user may revise the threshold preferences and try again.

TABLE 1

| Resource | Parameter | Value | Threshold defined by the user | SPM treatment of the values | Final value for resource |
|---|---|---|---|---|---|
| Rescue Team A | Availability | 0.3 Which means, for example, Rescue Team A was occupied in another emergency and it is not sure it is fully available. | 0.7 Any rescue team with a value of uncertainty under 0.7 cannot be considered in the planning. | Values between 0 and 0.7 (not included) equal to 0 (not available) Values between 0.7 (included) and 1 equal to 1 (available) | Rescue Team A availability equal to 0. NOT available and not considerate for planning |

In some examples, the method 200 of FIG. 2 includes identifying the uncertain information relating to the one or more resources (block 240) before carrying out the "thresholding" operation (block 250), such that the thresholding operation may be carried out only on the identified uncertain information. By implication, information that has not been identified as uncertain is deemed to be certain, and by not applying the thresholding operation to information that is certain (e.g., information that does not require transformation before use with an HTN-SPM), processing effort is reduced and/or efficiency is increased. The example method 200 of FIG. 2 includes providing the transformed information to an SPM for use in determining which of the resources to select for carrying out a mission (block 260). In some examples, the SPM is used (or invoked/executed) to produce one or more candidate mission plans for carrying out the mission goals (block 270). In some examples, a user may select a particular mission plan from the one or more candidate mission plans (e.g., the one or more candidate mission plans may be presented to the user, and the user may then make their selection (e.g., using the User Interface 1220 of FIG. 12)).

When transforming the uncertain information relating to resources, it is noted that efficiency and availability are positive attributes for a resource, while costliness and slowness are negative attributes for a resource. In such an example, a "greater than" test is used for comparing all scores against their respective thresholds, resulting in absolute indications as to whether or not each resource is efficient, available, costly and/or slow. Accordingly, the SPM to which the transformed information (in the form of the absolute indications) is passed is correspondingly arranged to take into account the positive or negative nature of each absolute indication when deciding which resources to select for use in the at least one mission plan. For example, the SPM is more inclined to choose resources that are indicated as being efficient and/or available, and less likely to choose resources that are indicated as being costly and/or slow. It will be appreciated, however, that in other examples the execution cost score and the execution time score may be compared against their respective thresholds using a "less than" test to transform those scores instead into absolute indications of whether or not the resource is cheap and whether or not the resource is fast. Because those are positive attributes, the SPM may then be correspondingly arranged to treat all of the transformed information in the same (positive) sense when deciding which resources to select. It will also be understood that rather than a "greater than" test, other examples may use a "greater than or equal to" test when comparing the threshold value(s) against the respective efficiency and/or availability scores, and/or a "less than or equal to" test when comparing the threshold value(s) against the respective cost and/or time scores. In such an example, a user might set the thresholds for cost and time at relatively low levels, while setting the efficiency and availability values at relatively high values, to cause the SPM to be more likely to select resources that are relatively cheap, quick, efficient and available. In another example, if ideal resources are relatively scarce, the user may indicate that they are prepared to compromise to some extent on cost, time, and efficiency, but that they require a high level of certainty that the job will get done, by setting thresholds for cost, time and efficiency at medium levels, and setting a relatively high threshold for availability. In some examples, one or more of the attribute scores for each particular resource may be normalized to be within a particular range (e.g., 0 to 1), for example by dividing the particular attribute score by an average or maximum expected value for that attribute score type. Such normalizing allows, in some examples, the corresponding thresholds to have similar magnitudes and, thus, may enhance user understanding (e.g., if the thresholds were to be shown on a GUI, such as the GUI 600 illustrated in FIG. 6). Other permutations may be readily apparent in the light of the foregoing description.

Additionally or alternatively, quantizing one or more of the resource attribute scores into a number of defined ranges can be performed by applying a plurality of threshold tests, with progressive threshold values. It will be appreciated that comparing an attribute score to a single threshold value (e.g., that has the result of a Boolean indication of whether the score is greater than/less than or equal to, or greater than or equal to/less than, the threshold) is a special case of quantizing an attribute score. The number of thresholds (and, thus, the number of quantization ranges) can advantageously be chosen to achieve an appropriate balance between numerical precision/resolution and certainty for each particular score. For example, quantizing into 10 ranges might be considered to give an acceptable precision of 0.1 while also giving an acceptable certainty to the attribute scores, while increasing the number of ranges would result in greater precision but lower certainty.

Figure 3:
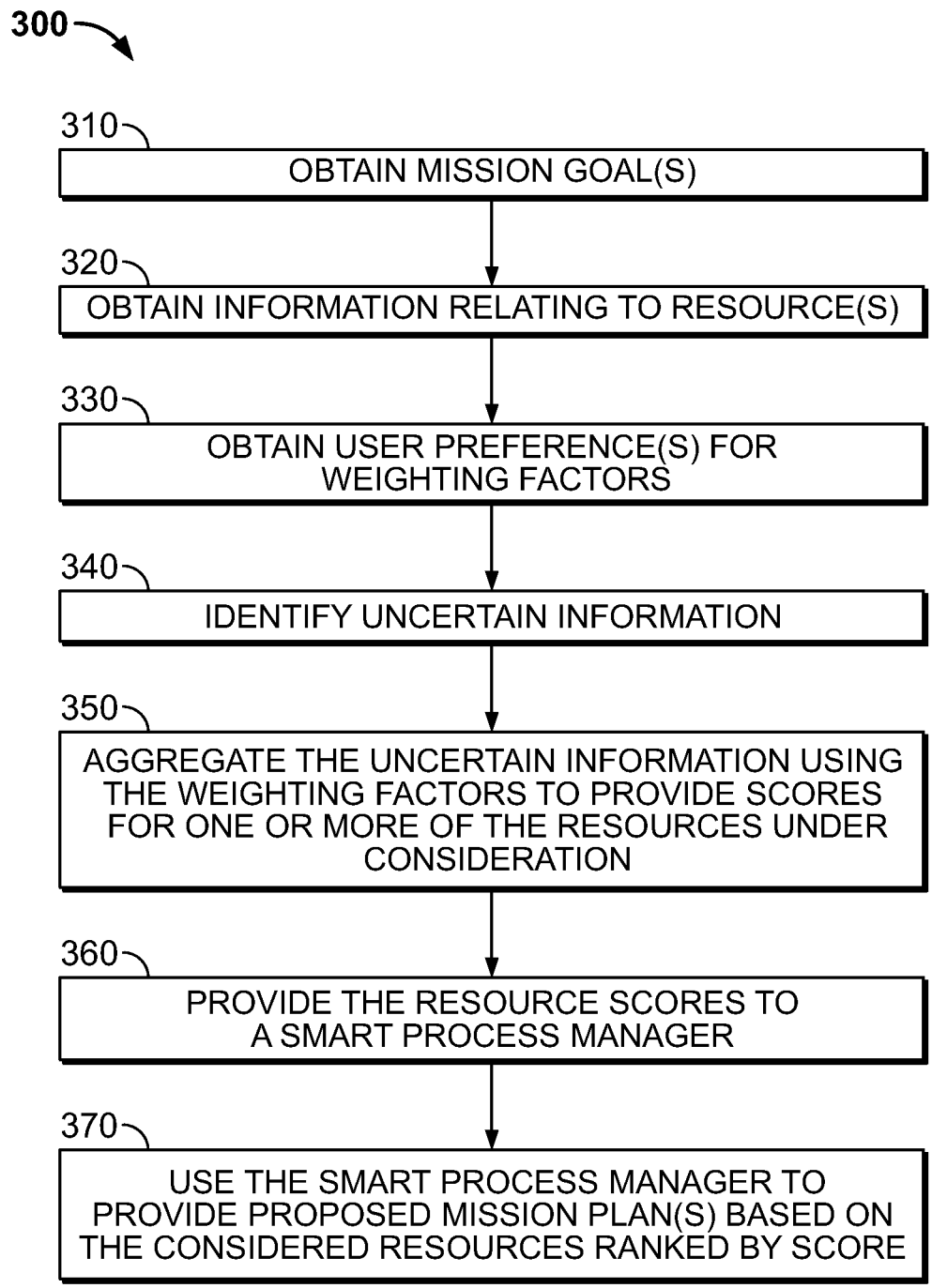
FIG. 3 is a flow chart representing another example method of processing information for use when producing a mission plan to accomplish a mission. In the example method of FIG. 3, an aggregate "resource score" for at least one resource is produced by multiplying each of a plurality of uncertain input knowledge values associated with the resource by a respective weighing factor, and summing the results.

FIG. 3 illustrates an example method 300 that includes obtaining mission goals (block 310) and obtaining information relating to one or more resources that may be used during execution of the mission (block 320), which may be performed similar to blocks 110, 120 of the example method 100 of FIG. 1. The example method 300 includes obtaining user preferences for respective weighting factors to be applied to each of the execution time score, the execution cost score, the availability score, and the efficiency score (block 330) (e.g., via the User Interface 1220 of FIG. 12). FIG. 6 illustrates the example GUI 600 that may be used by the User Interface 1220 (FIG. 12) to enable a user to select the "aggregate" method (e.g., using the "By aggregation" selection button 602) and to select weighting factors for each of the execution cost, the execution time, the availability and the efficiency scores (e.g., using a "Cost" slider 606, a "Time" slider 608, an "Availability" slider 610 and an "Efficiency" slider 612). Therefore, the user may select weighting factors for each resource attribute, according to how important the user deems each attribute score to be for the purposes of determining the usefulness of a particular resource for completing the mission. In the illustrated example of FIG. 6, the sliders 606, 608, 610, 612 are used as interactive elements. However, in other examples, other types of input means may be used, or the weighting factors may be stored in memory or retrieved across a network.

In some examples, the method 300 includes identifying uncertain information (block 340), which is discussed in further detail herein.

The example method 300 includes, for each resource, an "aggregation" operation that is carried out (e.g., by the Transformation Engine 1240 of FIG. 12) on the attribute scores relating to that resource (block 350). First, each attribute score of the information relating to the respective resource is multiplied by the weighting factor that corresponds to that score. Next, the results of those multiplications are summed, thereby arriving at an aggregate score for the respective resource, also referred to as a "resource score". Each of the resulting resource scores reflects the attributes (e.g., efficiency, availability, cost and speed) of the respective resource, weighted by the relative importance of each attribute (e.g., by virtue of those scores being multiplied by the user-supplied weighting factors). Positive attributes such as efficiency and availability (where higher scores are more favorable) are given a positive weighting factor, while negative attributes such as execution cost and execution time (where higher scores are less favourable) are given a negative weighting factor, such that when the weighted scores are summed, the result of the summation is a measure of the merits of the respective resource for completing the mission goals.

In some examples, the weighting factors the user sets using the GUI 600 of FIG. 6 enable the user to influence which resources the SPM chooses to execute a given task. For example, not all resources are equally efficient at carrying out a given task (e.g., as discussed herein, their efficiency scores are represented in the range of 0 to 1 for a nominal task, where 0 represents "inefficient" and 1 represents "efficient", although other representations may be used if corresponding changes are made elsewhere in the system and method). By adjusting the weighting factor for efficiency to a relatively high value, the efficiency scores for the resources are given a relatively large influence on the aggregated resource scores and, thus, the SPM is more likely to choose resources that are efficient. Conversely, by adjusting the weighting factor for efficiency to a relatively low value, the efficiency scores for the resources are given a relatively small influence on the aggregate resource scores and, thus, the SPM is more likely to choose resources based on factors other than efficiency. This may be useful, because for example sometimes it may be deemed by a user that it is most important to respond and execute a task quickly, rather than to execute a task efficiently.

In an example situation, a particular resource is tagged with the following attributes:

Execution cost score: 120 (before normalization)
Execution time score: 20 (before normalization)
Availability score: 0.6
Efficiency score: 0.7

Before aggregating the attribute scores, the execution cost score and the execution time score are both normalized against nominal values for a nominal resource (e.g., a resource that performs averagely in respect of execution cost and execution time), by, for example, dividing by the respective scores for such an "average" resource (e.g., dividing by 1000 for cost, and dividing by 100 for time), so that the execution cost and execution time scores do not dominate the efficiency and availability scores in the aggregate result.

Thus, the normalized scores for the example resource are:
Execution cost score: 0.12 (after normalization)
Execution time score: 0.2 (after normalization)
Availability score: 0.6
Efficiency score: 0.7

In this example, a user sets weighting factors (e.g., using the sliders 606-612 of FIG. 6) to select the following:
Cost weighting factor: 0.3
Time weighting factor: 0.9
Availability weighting factor: 0.9
Efficiency weighting factor: 0.5

In this example the user has selected a relatively small cost weighting factor of 0.3. Therefore, cost is considered of low importance to this user. Time and availability, on the other hand, are considered of high importance, because they have been assigned relatively high weighting factors of 0.9. Efficiency is considered of average importance, because it has been assigned a weighting factor of 0.5.

The attribute scores for each resource in this example are aggregated using the following formula (or similar):

$$\text{aggregate resource score} = \text{availability score} * \\ \text{availability weighting factor} + \\ \text{efficiency score} * \\ \text{efficiency weighting factor} - \\ \text{execution cost score} * \\ \text{cost weighting factor} - \\ \text{execution time score} * \\ \text{time weighting factor} \\ = 0.6*0.9 + 0.7*0.5 - \\ 0.12*0.3 - 0.2*0.9 \\ = 0.674$$

In this example, the calculation is repeated for each resource, and the SPM is provided with the results so that it may choose the most favourable resource(s) (e.g., the resource(s) having the highest resource score(s)). In some examples, one or more attribute scores may be processed by applying a threshold before being multiplied by the corresponding weighting factor (e.g., the execution cost score may be set to 0 if the execution cost is below a user-defined threshold or 1 if the execution cost is above or equal to the threshold). If the result of applying the threshold is chosen as 0 or 1 in this manner, then, in some examples, the corresponding attribute score may not be normalized. Furthermore, in some examples, instead of applying a single threshold test, the one or more of the attribute scores may be quantized by applying a plurality of threshold tests (e.g., setting the pre-processed attribute score to 0 if the attribute score is less than 0.3, setting to 0.5 if between 0.3 and 0.7, and setting to 1 if between 0.7 and 1).

In some examples, the method 300 of FIG. 3 includes identifying the uncertain information (block 340) before carrying out the aggregation operation (block 350), such that the aggregation operation can be carried out only on the identified uncertain information. In some examples, information that has not been identified as uncertain is deemed to be certain, and by not applying the aggregation operation to information that is certain (e.g., information that does not require transformation in order to be useable with an HTN-SPM), processing effort is reduced and/or efficiency is increased.

The example method 300 of FIG. 3 includes providing the transformed information (e.g., the resource score for each resource) to an SPM for use in determining which of the resources to select for carrying out a mission (block 360). In some examples, the SPM may be used to provide proposed mission plan(s) based on considered resources ranked by score (block 370), which may be performed similar to block 270 of the example method 200 of FIG. 2.

Figure 4:
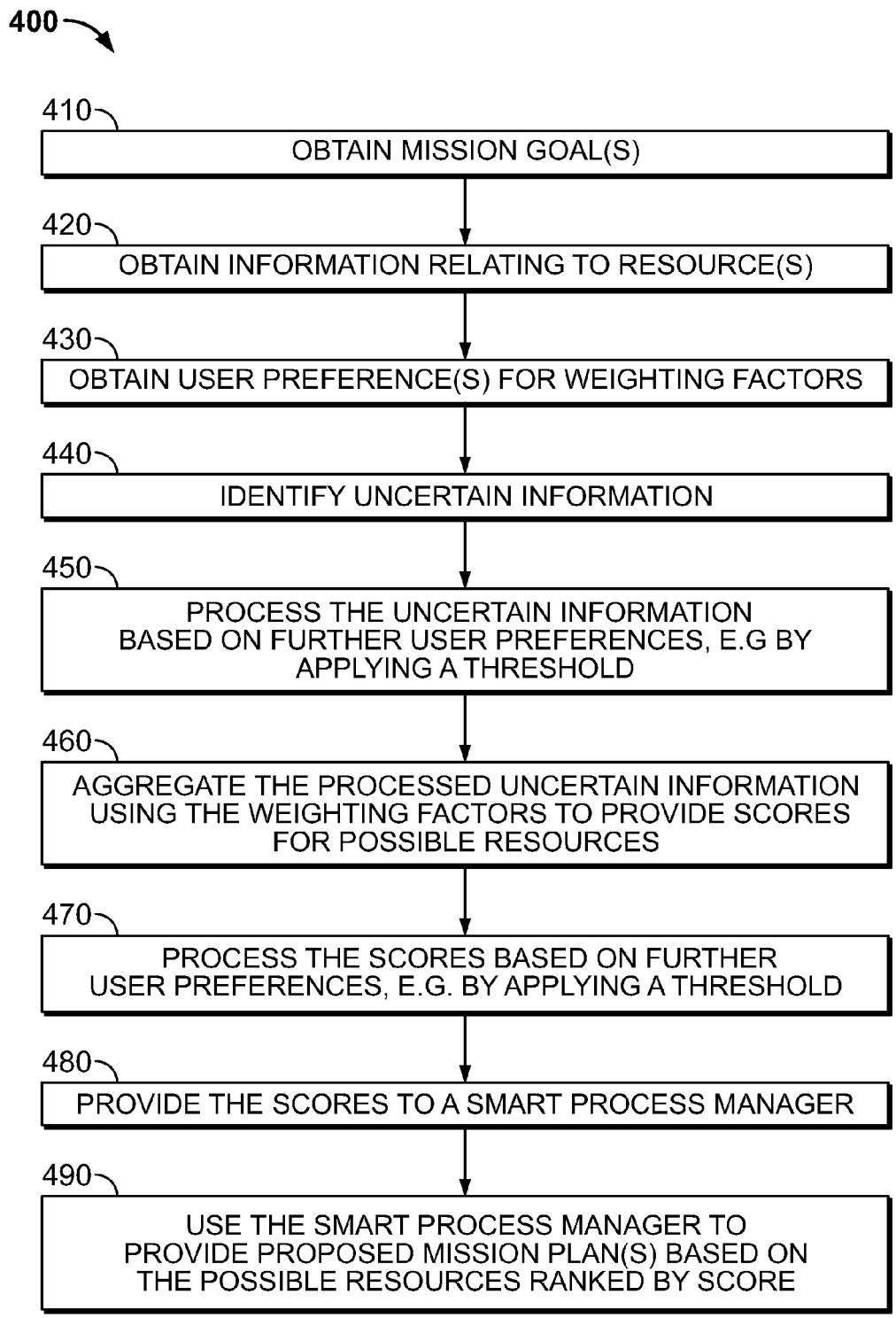
FIG. 4 is a flow chart representing another example method of processing information for use when producing a mission plan to accomplish a mission. In the example method of FIG. 4, input knowledge values may be preprocessed before being aggregated and/or aggregate "resource scores" for each of respective plurality of resources may be post-processed before being provided to a smart process manager for producing a mission plan.

FIG. 4 illustrates an example method 400 that includes obtaining mission goals (block 410), obtaining information relating to one or more resources that may be used during execution of the mission (block 420) and obtaining user preferences for respective weighting factors (block 430), which may be performed similar to the respective blocks 310, 320 and 330 of the example method 300 of FIG. 3. In some examples, the method 400 of FIG. 4 includes identifying uncertain information (block 440), which may be performed similar to block 340 of the example method 300 of FIG. 3. In the illustrated example of FIG. 4, the method 400 includes an "aggregation" operation that is carried out on the scores relating to the respective resource (block 460), which may be performed similar to block 350 of the example method 300 of FIG. 3. In the example method 400, the resource scores are provided to an SPM (block 480), which may be performed similar to block 360 of the example method 300 of FIG. 3. In some examples, the SPM may be used to produce one or more candidate mission plans (block 490), which may be performed similar to block 370 of the example method 300 of FIG. 3.

In some examples, the method 400 of FIG. 4 includes processing (e.g., pre-processing) the information relating to the one or more resources (block 450) (e.g., by a Pre-processing Engine 1230 of FIG. 12) before being operated on (e.g., by the Transformation Engine 1240 of FIG. 12), according to the "aggregation" operation (block 460). As described above with reference to block 350 of FIG. 3, the attribute scores for a particular resource can be normalized and/or converted to 0 or 1 by testing against a threshold, before inclusion in the aggregation calculation. However, in some examples, this may not occur if the attribute scores are provided pre-normalized in the range 0 to 1. The pre-processing includes one or more of the aforementioned quantizing, the aforementioned normalizing and/or pre-scaling at least one of the attribute scores (e.g., relating to efficiency, availability, execution cost and/or execution time). As disclosed herein, a "thresholding" operation quantizes a value into two ranges (e.g., above or equal to the threshold and below the threshold). The pre-processing (block 450) can include a thresholding operation similar to that of block 250 of the example method 200 of FIG. 2. By extension it will be appreciated that multiple thresholds (e.g., each at progressively higher levels) can be applied, to quantize the scores into more than two ranges. As described herein, thresholding/quantizing reduces uncertainty in the scores, and by adjusting the number of quantization steps a trade-off can be made between score resolution and uncertainty. Normalizing can be applied to the scores (e.g., by dividing each score by a maximum value for that respective score, or by a nominal value for that score (e.g., the value of that score for a nominal "average" resource)), thereby ensuring that the value of each score is in a range between 0 and 1, such that all scores contribute substantially equally to the aggregate result (e.g., the resource score) in the absence of differences in the weighting factors. Additionally or alternatively, pre-scaling can be applied, after normalizing, by multiplying a particular attribute score by a constant, thereby allowing control of the relative influence of that particular attribute score in the aggregate result (the "resource score") of the "aggregation" operation. In this manner, a bias (independent of user weighting factor selections) towards greater or lesser importance of one or more attribute scores can be introduced.

In the example method 400, the resource score, which is the result of the aggregation (block 460) (e.g., the output of the Transformation Engine 1240 of FIG. 12) can be post-processed (block 470) (e.g., by a Post-processing Engine 1250 of FIG. 12). For example, a thresholding or quantization operation can be applied to the respective aggregate result (e.g., the resource score) for each resource. In this manner, the certainty of the transformed information that is passed to the SPM (e.g., the SPM 1260 of FIG. 12) can be further increased. Furthermore, resources having resource scores that fall below a lower threshold can be completely withheld from being passed to the SPM (e.g., the SPM 1260 of FIG. 12), thereby reducing the number of resources needed to be considered by the SPM and thereby saving processing effort and/or increasing efficiency.

Figure 5:
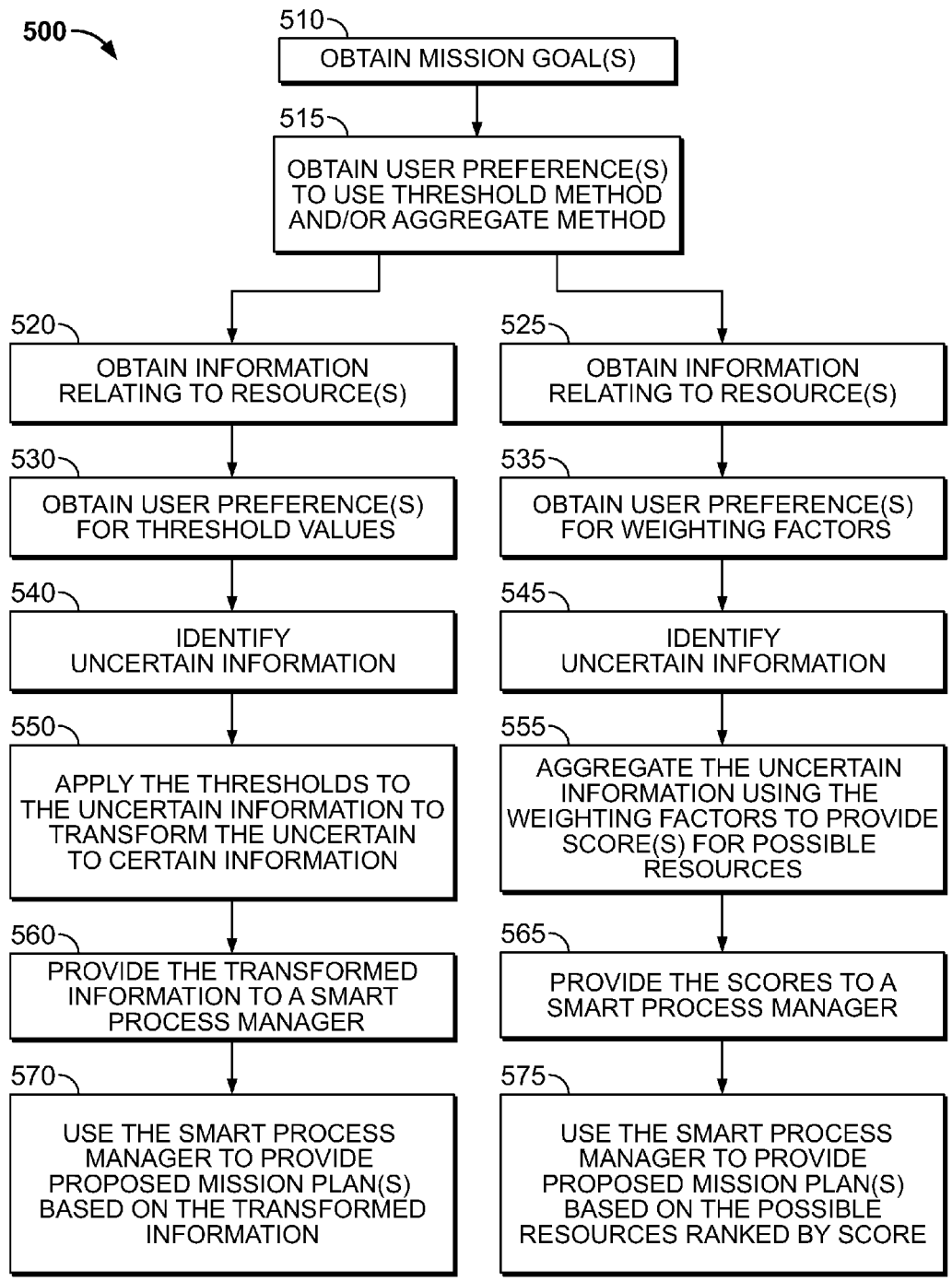
FIG. 5 is a flow chart representing another example method of processing information for use when producing a mission plan to accomplish a mission. In the example method of FIG. 5, a user preference is obtained as to which of a threshold and/or aggregating method is to be used to reduce imperfection in input knowledge.

FIG. 5 illustrates an example method 500 that includes obtaining mission goals (block 510), which may be performed similar to block 310 of the example method 300 of FIG. 3. In the example method 500, a user is given the choice to choose between the "threshold" method (e.g., as disclosed herein with reference to FIG. 2) and the "aggregation" method (e.g., as disclosed herein with reference to FIGS. 3 and 4) (block 515). Blocks 520, 530, 540, 550, 560 and 570 of the example method 500 of FIG. 5 are substantially the same as the respective blocks 220, 230, 240, 250, 260 and 270 of the example method 200 of FIG. 2. Blocks 525, 535, 545, 555, 565 and 575 of the example method 500 of FIG. 5 are substantially the same as the respective blocks 320, 330, 340, 350, 360 and 370 of the example method 300 of FIG. 3.

Any of the features or aspects of the disclosed examples can be combined in any way as described herein, and not all steps of each example are required. In some examples, either of the "threshold" method or the "aggregation" method can be omitted such that only the remaining method is available for selection. In such an example, the step of selecting one or other of those methods can be omitted when only a single option remains for selection. In other examples, the "threshold" operation (block 550) and the "aggregation" method (block 555) can be serially combined (e.g., within the Transformation Engine 1240 of FIG. 12), with either operation preceding the other, and the composite result of both operations being passed to the SPM (e.g., the SPM 1260 of FIG. 12).

FIG. 6 illustrates the example GUI 600 that may be implemented as the User Interface 1220 of FIG. 12, which may be implemented using a computer and a display, and with which a user may interact using input means such as a keyboard, mouse/trackball and/or touchscreen. In the illustrated example, the GUI 600 includes the button 602, 604 for selecting one, or the other, or both of the "aggregation" method and the "thresholding" method. In some examples, the buttons 602, 604 can be mutually exclusive such that the option of having both methods selected is excluded.

In the illustrated example, the GUI 600 includes a region associated with the aggregation selection button 602, having the sliders 606, 608, 610, 612, which are slideable by a user to set the aforementioned respective weighting factors to be applied to each of the attribute scores (e.g., the execution cost score, the execution time score, the availability score and the efficiency score) for each resource. In other examples, other Graphical User Interface controls may be used.

The GUI 600 of FIG. 6 includes a region associated with the thresholding selection button 604, having an alphanumeric entry field for setting at least one threshold value. In the illustrated example, the text entry field 614 is provided for entering a threshold level (e.g., in terms of a percentage of full range, or in terms of an absolute value) to be applied to all of the attribute scores. In other examples, separate fields may be provided corresponding with each of the attribute scores. In other examples, instead of one or more alphanumeric entry fields, slider buttons may be provided for setting the threshold value(s).

In some examples, the GUI 600 includes a control 616 for a user to indicate the optimism with which an assumed location of resources should be regarded. In the illustrated example, the control 616 has three selection buttons by which a user can select: "optimistic"; "average"; or "pessimistic" choices. However, in other examples, other input means and other numbers of subdivisions can be used. Further, although the control 616 is illustrated as being associated with the "aggregation" method controls in the example of FIG. 6, in other examples the selected optimism may have relevance to not only the "aggregation" method but also to the "threshold" method.

Figure 7:
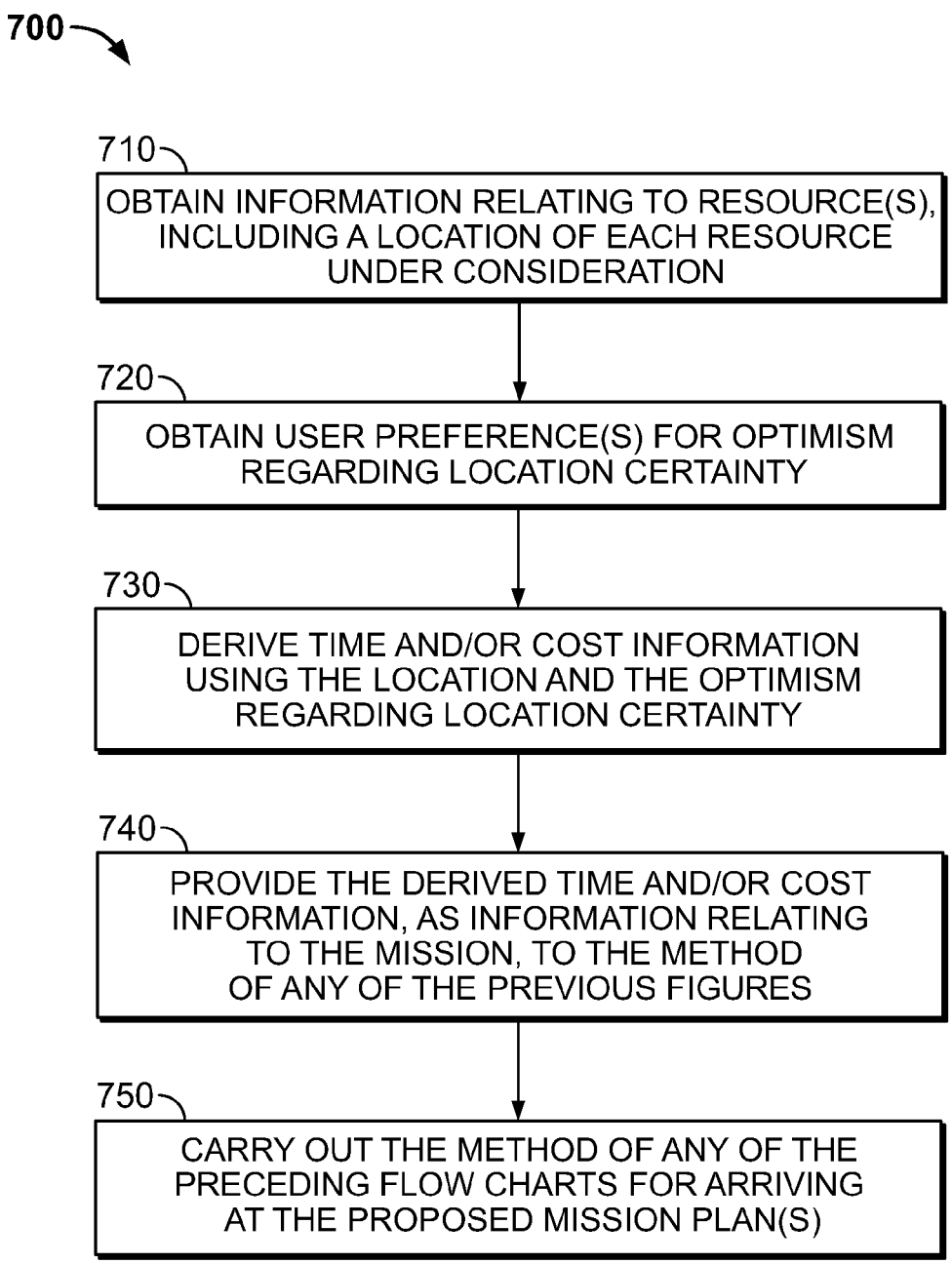
FIG. 7 is a flow chart representing another example method of processing information for use when producing a mission plan to accomplish a mission, and which may be implemented in any of the example methods of FIGS. 1 to 5. In the example method of FIG. 7, an execution time score and/or an execution cost score are derived from an assumed location of a resource and a level of optimism regarding certainty of the assumed location.

FIG. 7 illustrates an example method 700, in which the execution time score and execution cost score for a resource are derived from the assumed location of the resource and the user-indicated optimism with which assumed location is to be regarded. The example method 700 includes obtaining information relating to the mission (block 710), including an assumed location of each resource under consideration for inclusion in the mission. The example method 700 includes obtaining user preferences as to the optimism with which the assumed location of resources is to be regarded (block 720). In the example method 700, the execution time score and/or execution cost score for at least one resource is derived at least partly using the assumed resource location and the indicated optimism (block 730). The example method 700 includes providing the derived execution time score and execution cost score to any of the example methods of FIGS. 1-5 (block 740) where the respective methods 100, 200, 300, 400, 500 are performed (block 750).

In some examples, the derivation of time and/or cost information (block 730) is performed as follows. For each resource under consideration for possible selection by the SPM (e.g., the SPM 1260 of FIG. 12) for carrying out a particular mission step (as part of a mission plan for accomplishing mission goals), that resource has an assumed location (e.g., a geographical location at which the resource is assumed to be currently located). In order to carry out the particular mission step, the resource needs to be located at a target location where the mission step is to be carried out, and which may or may not be the current location of the resources. If the resource is not currently at the target location, then the resource needs to move to the target location before the resource may commence carrying out the mission step. Moving a resource takes time and money. As a result, the execution time score and execution cost score for that resource is at least partly influenced by the distance between the assumed current location of the resource and the target location. For example, the execution cost may include a fixed component related to staffing costs, resource purchase costs, etc., and may also include variable fuel costs that depend on the distance traveled when moving the resource to the target location. The target location may be a fixed, known geographical location (e.g., a location on a map) having no inherent uncertainty, or alternatively the target location may be the location of an object that is incompletely known and, thus, includes some uncertainty. Therefore, one or both of the resource and the target location include uncertainty. In order to derive the execution cost score and the execution time score, the distance between the resource and the target location is determined, based on: the assumed location of the resource; the target location; and the user-selected optimism with which the assumed location of resources is to be regarded.

Figure 9A:
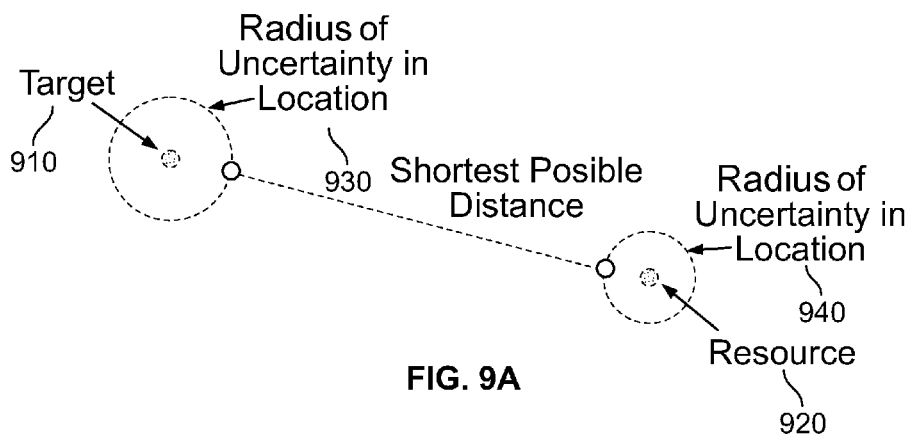
FIGS. 9A and 9B are example graphical depictions of uncertainty in the assumed location of a particular resource associated with a mission plan, and uncertainty in the location of a target associated with the mission plan, illustrating, respectively, optimistic and pessimistic distances between the resource and target.
Figure 9B:
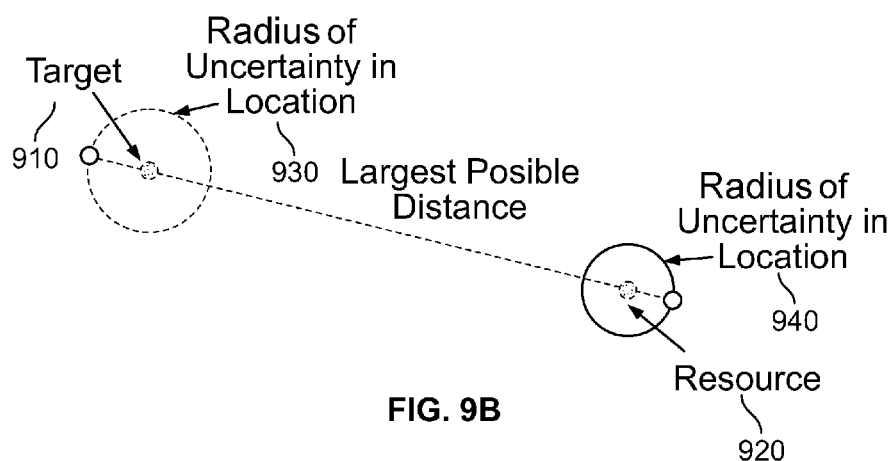

As illustrated in FIGS. 9A and 9B, a target 910 and a resource 920 each have an assumed location (e.g., the respective dot markers), and also have a respective radius of uncertainty 930, 940 relating to each of the assumed locations (e.g., the estimated possible error in the assumed location). Each radius of uncertainty 930, 940 defines a circumference enclosing a circular area having at its center the respective assumed location, somewhere within which the resource is assumed to be located. As illustrated in FIG. 9A, the user has selected an "optimistic" view of assumed resource location, in which case the example method 700 calculates the shortest possible distance between the resource 920 and the target 910 by plotting the distance between the least distant respective points on the circumference around the target (e.g., the radius of uncertainty of the target 930) and the circumference around the resource (e.g., the radius of uncertainty of the resource 940). In the illustrated example of FIG. 9B, the user has selected a "pessimistic" view of assumed resource location, in which case the example method 700 calculates the longest possible distance between the resource 920 and the target 910 by plotting the distance between the most distant points on the circumference around the target (e.g., the radius of uncertainty of the target 930) and the circumference around the resource (e.g., the radius of uncertainty of the resource 940), respectively. In the instance where the user selects an "average" level of optimism, the example method 700 calculates the distance between the assumed resource location and the assumed target location. In cases where the target location is completely known then accordingly the radius of uncertainty associated with the target location is zero and, thus, all points on the circumference around the target are coincident with the assumed target location.

Figure 8:
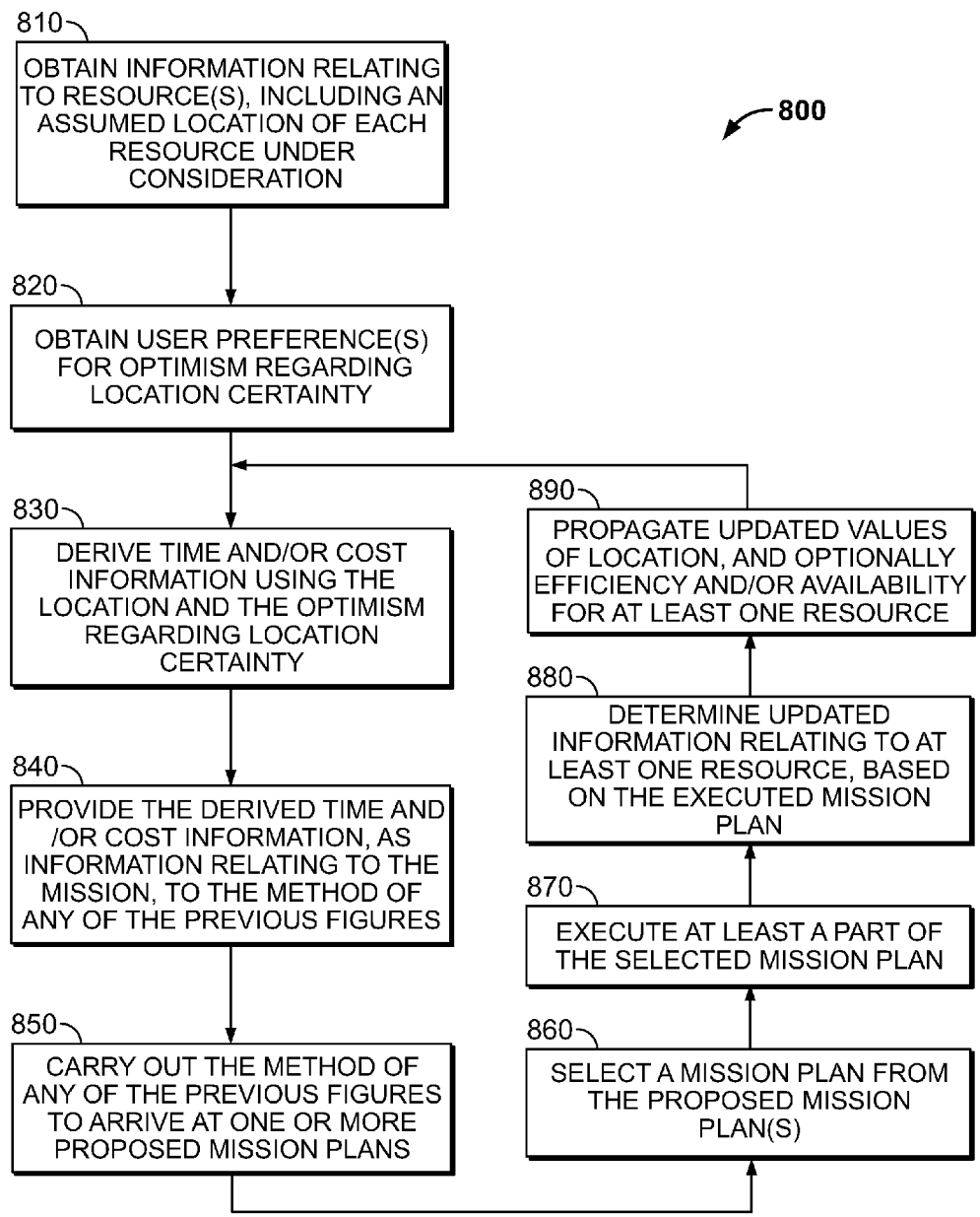
FIG. 8 is a flow chart representing another example method of processing information for use when producing a mission plan to accomplish a mission, and in which the example method of FIG. 7 may be augmented by determining a changed value and/or changed uncertainty of one or more of the input information relating to a resource, as a result of performing one or more steps of the mission plan. The example method of FIG. 8 includes propagating the changed value and/or changed uncertainty back into a further iteration of the example method of FIG. 7 as updated input information relating to the resource for use in producing successive mission plan steps.
Figure 10:
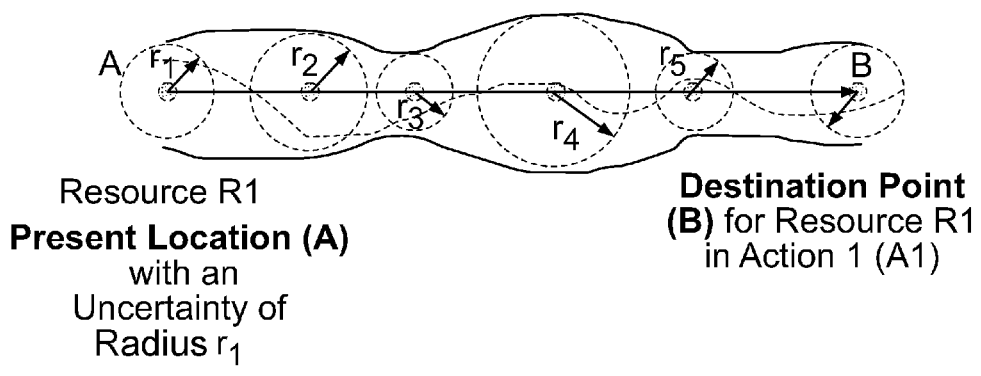
FIG. 10 is an example graphical depiction of uncertainty in an assumed location of a resource associated with a mission plan, as the resource progresses from a first location A to a destination location B.
Figure 11:
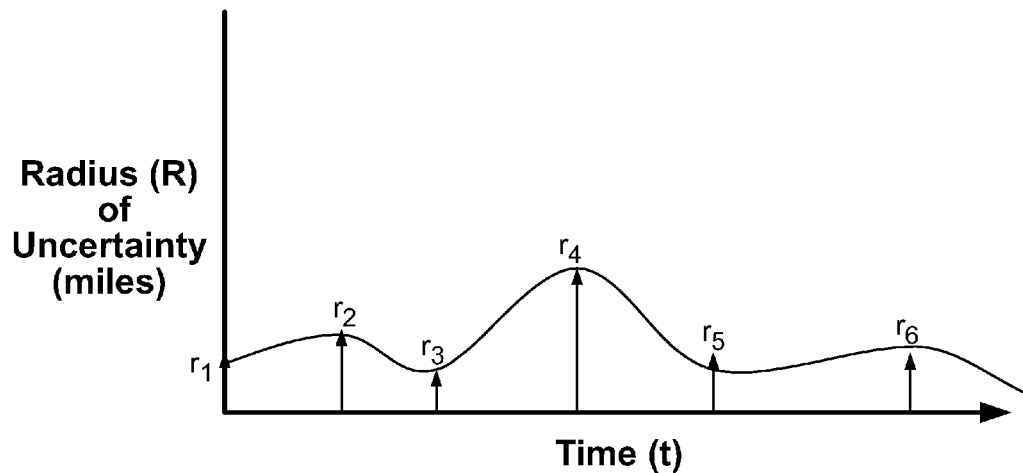
FIG. 11 is an example graphical plot of the uncertainty in the assumed location of the resource of FIG. 10.

FIG. 8 illustrates an example method 800 in which the example method 700 of FIG. 7 is extended to take account of a radius of uncertainty of an assumed location of a resource, which radius changes as the resource executes mission steps and, thus, moves its location over time. FIG. 10 illustrates an example of how the radius of uncertainty in an assumed location of a resource R1 changes as the resource executes mission steps and moves from a first location A to a destination location B in a series of 5 movements. In the illustrated example, the radius of uncertainty is initially r1. After the resource moves (e.g., as a result of executing a mission step) from the first location A to the second location, which is immediately to the right of location A in FIG. 10, the new radius of uncertainty r2 has increased compared with the initial radius of uncertainty r1 (i.e., r2>r1). With each successive move, the successive radii of uncertainty r3, r4, r5 vary. Although the radius of uncertainty might be expected to always increase over time (e.g., due to location drift, subject to tides and sea currents in a marine example, or due to dead-reckoning calculation and/or measurement errors in a land-based example), it is not always the case that the radius of uncertainty increases with each movement because, for example, the resource may pass near a monitoring station or be periodically locatable by some feedback means that allows the actual location of the resource to be ascertained more accurately than at an earlier time, in which case the radius of uncertainty is reduced. When the resource arrives at destination B, for example, the fact of the arrival of the resource at the destination B may be verifiable and, thus, the resource may inherit the radius of uncertainty of the destination location. FIG. 11 shows a graphical representation of how the radius of uncertainty of a resource (e.g., the resource R1 shown in FIG. 10) can vary against time in an example situation.

Returning to FIG. 8, blocks 810-850 may be preformed similar to the respective blocks 710-750 of the example method 700 of FIG. 7. The example method 800 of FIG. 8 includes selecting a mission plan for execution from the one or more candidate mission plans (block 860) generated by the SPM (e.g., the SPM 1260 of FIG. 12) (block 850). The example method 800 includes executing at least a part (e.g., at least one mission step) of the selected mission plan (block 870). In some examples, the at least one part involves at least one resource being used in the execution of the at least one mission step and, as a result, at least one resource may move from an initial assumed location A with radius of uncertainty r1, to a second (updated) assumed location with an updated radius of uncertainty r2 (e.g., as shown in FIGS. 10 and 11). The example method 800 includes determining the updated assumed location and updated radius of uncertainty r2 (block 880), and propagating updated assumed location and updated radius of uncertainty r2 (block 890) into a further iteration of the example method 800, where updated execution time and execution cost scores are derived based upon the updated assumed resource location and the updated radius of location uncertainty (block 830). In some examples, any updates to an efficiency score of a resource and/or availability score that have resulted from the execution of one or more mission steps using that resource are also propagated into the further iteration of the example method 800 (e.g., starting at block 830). For example, the efficiency of the resource remains unchanged, being a function of the type of resource, and the availability of the resource becomes "1=available" due to the device having just been used and therefore being known to be available. In another example, however, the efficiency of the resource may be updated to reflect wear and tear, and the availability of the resource may be updated to mark the device as unavailable if, for example, it has run out of fuel. Using the updated resource attribute scores, the example method 800 calculates more up-to-date or current (e.g., and, thus, more accurate) transformed information that may be provided to the SPM (e.g., the SPM 1260 of FIG. 12) for producing successive updated candidate mission plans. Thus, the effectiveness with which mission goals can be achieved is improved.

FIG. 12 depicts a block diagram of an example system 1200 having a plurality of interconnected modules, which can be implemented in hardware and/or software, or by a combination of the two, to perform any of the example methods 100, 200, 300, 400, 500, 700, 800 of FIGS. 1-5, 7 and 8. The User Interface 1220 is a module implementing a user interface (e.g., a GUI, such as the GUI 600 of FIG. 6), via which a user may input preferences and/or via which the user may view output results from the disclosed methods (e.g., such as one or more proposed candidate mission plans produced by the SPM 1260). The Resource Attribute and Mission Goals Store 1210 includes a memory for storing the information relating to the resources (e.g., including the resource attribute scores) and/or the mission goals. In other examples, the resource attribute scores and/or mission goals are provided by other means such as over a computer network or via a user interface such as a GUI. The Transformation Engine 1240 is arranged to carry out the transformation method disclosed herein with reference to FIGS. 1 to 5, which transform the resource attribute scores into transformed information to be provided to the SPM 1260. In some examples, the Transformation Engine 1240 may also be arranged to carry out the methods disclosed herein with reference to FIGS. 7 and 8. The SPM 1260 may be, for example, an HTN type of SPM. In some examples, the Pre-processing Engine 1230 is arranged to carry out the pre-processing of resource attribute scores (e.g., as disclosed herein with reference to blocks 440, 450 of FIG. 4). In some examples, the Post-processing Engine 1250 is arranged to carry out the post-processing of resource attribute scores (e.g., as disclosed herein with reference to block 470 of FIG. 4.

Examples of applications of the methods disclosed herein include emergency response planning and critical infrastructures protection. For example, in an emergency response situation (e.g., a vehicle accident, a natural catastrophe, a manmade threat situation), when the emergency is first detected a plan is to be devised that likely involves resources such as ambulances, medical teams, hospitals, police, etc. In a typical scenario, parties involved in the emergency may need to be collected from the location of the emergency, transported to a reception center or hospital, and then processed by medical teams and/or police. Such a scenario typically requires the effective coordination of all parties involved, and for such an effective coordination to take place the methods described herein are invaluable. For example, in a real-world emergency response situation, there might be a lost connection between the call center receiving the emergency call and one of the emergency teams (e.g., medical, police, sea-rescue) and, thus, the exact location and availability of that resource may not be completely known (e.g., uncertain). By applying the "threshold" (e.g., as disclosed with reference to FIG. 2) and/or "aggregation" (e.g., as disclosed with reference to FIG. 3) methods disclosed herein, the SPM is enable to more effectively choose which resource(s) should be used for producing a mission plan directed at responding to the emergency. In particular, the aggregate method allows greater weight to be placed on certain resource attributes (e.g., availability) than other attributes (e.g., efficiency), which enables the SPM to produce a plan that is weighted towards a particular goal (e.g., reliably responding, as opposed to quickly or efficiently responding). In other words, depending on the requirements it may be desirable to select less efficient resources for which there is more certainty of their availability, such as firemen trained in first aid, rather than very well trained medical staff who are very unlikely to be available. The disclosed methods provide for such a trade-off to be made, as appropriate for the circumstances.

As another example, consider the scenario where an incident alarm is activated in a power plant. According to the type of alarm, speed or alternatively efficiency of response may be paramount, and a plan involving resources such as autonomous robots and/or unmanned vehicles, fire brigades, medical staff, etc. may need to be devised to respond to the particular situation. The example methods disclosed herein may be used to assist in such a situation.

The examples of the present disclosure may be computer-implemented by execution of program steps by a computer system having a processor. An example computer system suitable for implementing the disclosed examples is illustrated in FIG. 13.

FIG. 13 illustrates an example computer system 1300 having a computer network 1330 and a device 1310, in which any of the example methods 100, 200, 300, 400, 500, 700, 800 of FIGS. 1-5, 7 and 8 may be deployed.

The device 1310 on which all or part of the disclosed methods are implemented may be arranged to communicate with other devices 1320, 1340, which may implement all or a remaining part of the method, over the network 1330. For example, one or more of the other devices 1320, 1340 may supply input knowledge relating to one or more resources to the device 1310. For example, one or more of the other devices 1320, 1340 may include hardware and/or software for: collecting input knowledge relating to one or more resources; processing that input knowledge; and/or sending processed input knowledge to the device 1310, which may include an SPM. The network 1330 may be any kind of network suitable for transmitting or communicating data. For example, the network 1330 may include one or more of a local area network, a wide area network, a metropolitan area network, the internet, a wireless communications network, a cable network, a digital broadcast network, a satellite communication network, a telephone network, etc. The device 1310 may be arranged to communicate over the network 1330 using any suitable communication mechanism/protocol in order to communicate data. It is further appreciated that other communication scenarios are possible. For example, the input data values may be provided via a physical medium (e.g., a CD, a DVD, a BluRay disc, etc.), or manually entered (e.g., via a keyboard), in which either case all or part of the system 1300 may be omitted. In a similar manner, any of the devices 1310, 1320, 1340 of FIG. 13 may provide or receive data using physical media instead of via the network 1330, in which case a corresponding part of the system 1300 may be omitted.

The device 1310 may include one or more computing devices as illustrated in FIG. 14, which illustrates an example of such a computing device 1400. The computing device 1400 includes a computer 1402. The computer 1402 includes a storage medium 1404, a memory 1406, a processor 1408, a storage medium interface 1410, a user output interface 1412, the user input interface 1414 and the network interface 1416, which are communicatively coupled to each other via one or more communication buses 1418.

The example storage medium 1404 may be any form of non-volatile data storage device such as one or more of a hard disk drive, a magnetic disc, an optical disc, a ROM, etc. The storage medium 1404 may store an operating system for the processor 1408 to execute in order for the computer 1402 to function. The storage medium 1404 may also store one or more computer programs (e.g., software, instructions or code) that form part of an example of the disclosure. The memory 1406 may be any random access memory (e.g., a storage unit or a volatile storage medium) suitable for storing data and/or computer programs (e.g., software, instructions or code) that form part of an example of the disclosure. Such data may, for example, include the input knowledge relating to the one or more resources, as described herein. Such computer programs may, for example, include computer programs or computer program code for carrying out the methods shown and described herein with reference to FIGS. 1-12, including any modifications or additional method steps as a skilled person would understand.

The example processor 1408 of FIG. 14 may be any data processing unit suitable for executing one or more computer programs (e.g., such as those stored on the storage medium 1404 and/or in the memory 1406), some of which may be computer programs according to examples of the disclosure or computer programs that, when executed by the processor 1408, cause the processor 1408 to carry out a method according to an example of the disclosure and configure the system 1400 to be a system according to an example of the disclosure, such as the example(s) disclosed with reference to FIGS. 13 and 14. The processor 1408 may include a single data processing unit or multiple data processing units operating in parallel or in cooperation with each other. The processor 1408, in carrying out data processing operations for examples of the disclosure, may store data to and/or read data from the storage medium 1404 and/or the memory 1406, such data being for example the input knowledge as described herein. In some examples, the processor 1408 may include, or be arranged to operate with, an arithmetic unit for assisting the processor 1408 in calculating the results of calculations, such as the examples given in Table 1. For example, the arithmetic unit may operate on the input knowledge by applying weighting factors by multiplication or division or other arithmetic operation, as described herein with reference to the examples that carry out an "aggregation" method. The arithmetic unit may thus advantageously assist in the calculations performed in the described method.

The example storage medium interface 1410 may be any unit for providing an interface to a data storage device 1422 external to, or removable from, the computer 1402. The data storage device 1422 may be, for example, one or more of an optical disc, a magnetic disc, a solid-state-storage device, etc. The storage medium interface 1410 may therefore read data from, or write data to, the data storage device 1422 in accordance with one or more commands that it receives from the processor 1408.

The example user input interface 1414 is arranged to receive input from a user, or operator, of the system 1400. The user may provide this input via one or more input devices of the system 1400, such as a mouse or other pointing device 1426 and/or a keyboard 1424, that are connected to, or in communication with, the user input interface 1414. However, in other examples, the user may provide input to the computer 1402 via one or more additional or alternative input devices (e.g., a touch screen). The computer 1402 may store the input received from the input devices via the user input interface 1414 in the memory 1406 for the processor 1408 to subsequently access and process, or may pass it straight to the processor 1408, so that the processor 1408 may respond to the user input accordingly. The user is, for example, a user of a mobile device or tablet, or a user of a personal computer, who is viewing the input knowledge and/or the mission plan produced by the HTN-SPM, and who may wish to interact with the device.

The user output interface 1412 is arranged to provide a graphical/visual and/or audio output to a user, or operator, of the system 1400. As such, the processor 1408 may be arranged to instruct the user output interface 1412 to form an image/video signal representing a desired graphical output, and to provide the signal to a monitor 1420 (e.g., a screen, a display unit) of the system 1400 that is connected to the user output interface 1412. Such output may, for example, include details of a candidate mission plan, produced by the HTN-SPM, to be considered and/or followed by the user in order that the mission goals can be achieved. Additionally or alternatively, the processor 1408 may be arranged to instruct the user output interface 1412 to form an audio signal representing a desired audio output, and to provide this signal to one or more speakers 1421 of the system 1400 that is connected to the user output interface 1412.

The example network interface 1416 provides functionality for the computer 1402 to download data from and/or upload data to one or more data communication networks (e.g., the network 1330 of FIG. 13).

It will be appreciated that the architecture of the computing device 1400 illustrated in FIG. 14 and described herein is merely exemplary and that other computing devices 1400 with different architectures (e.g., having fewer components than shown in FIG. 14 or having additional and/or alternative components than shown in FIG. 14) may be used in examples of the disclosure. It will also be appreciated that the device 1310 of FIG. 13 may use different kinds of the computing device 1400. For example, the computing device 1400 may be a mobile telephone, a tablet, a laptop, a television set, a set top box, a games console, a personal computer, a server computer, another mobile device or consumer electronics device, etc.

In some examples, the illustrated and described separation of functionality and processing between the described elements is purely conceptual and is presented herein merely for ease of explanation. It will be appreciated that while the example methods disclosed herein have been illustrated as individual steps carried out in a specific order, these steps may be combined, rearranged, omitted and/or carried out in a different order while still achieving the desired result.

It will be appreciated that examples of the disclosure may be implemented using a variety of different information processing systems. In particular, although the figures and the discussion thereof provide an exemplary computing system and methods, these are presented merely to provide a useful reference in discussing various aspects of the disclosure. Examples of the disclosure may be carried out on any suitable data processing device, such as a personal computer, laptop, personal digital assistant, mobile telephone, set top box, television, server computer, etc. The description of the systems and methods has been simplified for purposes of discussion, and they are just one of many different types of systems and methods that may be used for examples of the disclosure. It will be appreciated that the boundaries between logic blocks are merely illustrative and that alternative examples may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Additionally or alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements. Method steps implemented in flow charts contained herein, or as described above, may each be implemented by corresponding respective modules, multiple method steps implemented in flowcharts contained herein, or as described above, may together be implemented by a single module.

It will be appreciated that, insofar as examples of the disclosure are implemented by a computer program, then a storage medium and a transmission medium carrying the computer program form aspects of the disclosure. The computer program may have one or more program instructions, or program code, which, when executed by a computer carries out an example of the disclosure. The term "program", as used herein, may be a sequence of instructions designed for execution on a computer system, and may include a subroutine, a function, a procedure, a module, an object method, an object implementation, an executable application, an applet, a servlet, source code, object code, a shared library, a dynamic linked library, and/or other sequences of instructions designed for execution on a computer system. The storage medium may be a magnetic disc (e.g., a hard drive, a floppy disc), an optical disc (e.g., a CD-ROM, a DVD-ROM, a BluRay disc), a memory (e.g., a ROM, a RAM, EEPROM, EPROM, Flash memory, a portable/removable memory device), etc. The transmission medium may be a communications signal, a data broadcast, a communications link between two or more computers, etc.

It will be appreciated that the disclosure has applications in many fields, particularly in fields where the input knowledge is of reduced quality/precision/certainty, and wherever input knowledge is incompletely or inaccurately known. Thus, the disclosure may find applications in industrial process, production, design and/or project planning, aeronautical maintenance planning, and/or logistics planning. In addition the disclosure may be used in medical/emergency response planning, critical infrastructure protection (CIP) planning, operations planning, and/or other mission planning operations.

Although examples have been disclosed in detail, the features of certain examples and aspects thereof may be combined and/or interchanged with those of other examples or aspects, where appropriate, as would be understood by a skilled person reading the claims. The person skilled in the art will further appreciate that variations may be made to the above described examples without departing from the scope of the disclosure as defined by the appended claims.

What is claimed is:

1. A computer-implemented method of processing information to use when producing a mission plan to accomplish a mission, the method comprising:
   obtaining one or more mission goals to be achieved during execution of the mission;
   obtaining information relating to one or more resources to be used during execution of the mission, the information including an execution time score indicating a time for the respective resource to execute its part of the mission, an execution cost score indicating a cost for the respective resource to execute its part of the mission, an availability score indicating a level of availability of the respective resource to execute its part of the mission, and an efficiency score indicating a level of efficiency of the respective resource when executing its part of the mission, the information including uncertainty, wherein for each resource, the information relating to a respective resource further includes an assumed location of the respective resource, each assumed location having an associated radius of uncertainty, and wherein obtaining the information relating to the respective resource includes deriving at least one of the execution time score or the execution cost score for the respective resource, using the assumed location of the respective resource, and based on an indicated optimism and the respective radius of uncertainty associated with the assumed location of the respective resource;
   obtaining user preferences relating to how the uncertainty is to be handled by obtaining from the user the indicated optimism, which is an optimism to be associated with the assumed locations, the user preferences including weighting factors to be applied to the execution time score, the execution cost score, the availability score, and the efficiency score for each respective resource;
   transforming, via a processor, the information relating to the one or more resources according to the user preferences to reduce the uncertainty in the information by aggregating the execution time score, the execution cost score, the availability score, and the efficiency score for each resource as a weighted combination using the weighting factors to produce an overall resource score for each resource, the transformed information including the overall resource score for each resource;
   providing, via the processor, the transformed information to a smart process manager, for use by the smart process manager to identify one or more of the resources that are to be used to execute at least one mission step as part of at least one mission plan to achieve the one or more mission goals and accomplish the mission;
   executing a mission step of the at least one mission plan;

updating, via the processor, at least one of the assumed location or the radius of uncertainty for at least one resource used in the executed mission step; and providing, via the processor, updated information to the smart process manager to produce a further mission step and/or an updated mission plan based on the updated assumed location and/or radius of uncertainty associated with the assumed location.

2. The method of claim 1 further comprising:

identifying, via the smart process manager, based on the transformed information, the one or more of the resources that are to be used in the at least one mission step as part of the at least one mission plan to accomplish the one or more mission goals;

producing, via the smart process manager, based on the identified resources, the at least one mission plan to accomplish the one or more mission goals;

totaling, via the smart process manager, the overall resource scores for the resources in a respective mission plan to produce a mission score associated with the respective mission plan; and providing, via the smart process manager, the at least one mission plan to a user, ranked in an order based on the associated mission score for each mission plan.

3. The method of claim 1, wherein:

obtaining the user preferences comprises obtaining one or more threshold values, each threshold value relating to one of the execution cost score, the execution time score, the efficiency score or the availability score; and transforming the information comprises at least one of:
  if a cost threshold value is obtained, transforming the execution cost score for each resource to an absolute indication of cost having two possible values corresponding to whether or not the respective resource is costly by comparing the execution cost score to the cost threshold value;
  if a time threshold value is obtained, transforming the execution time score for each resource to an absolute indication of time having two possible values corresponding to whether the respective resource is fast or slow by comparing the execution time score to the time threshold value;
  if an availability threshold value is obtained, transforming the availability score for each resource to an absolute indication of availability having two possible values corresponding to whether or not the respective resource is available by comparing the availability score to the availability threshold value; or
  if an efficiency threshold value is obtained, transforming the efficiency score for each resource to an absolute indication of efficiency having two possible values corresponding to whether or not the respective resource is efficient or inefficient by comparing the efficiency score to the efficiency threshold value.

4. The method of claim 3, wherein the smart process manager is to identify as useable, to execute the at least one mission step as part of the at least one mission plan, a resource having at least one of an absolute indication of availability indicating that the resource is available, an absolute indication of efficiency indicating that the resource is efficient, an absolute indication of execution cost indicating that the resource is not costly, or an absolute indication of execution time indicating that the resource is not slow.

5. The method of claim 1, wherein providing the transformed information comprises providing to the smart process manager the transformed information of those resources that have an overall resource score greater than a resource score threshold value, such that the resources having an overall resource score greater than the resource score threshold are considered by the smart process manager for inclusion in the at least one mission plan.

6. The method of claim 1 further comprising, for each of the at least one mission plan, totaling the overall resource scores for each of the resources used in the respective mission plan to produce a respective mission score associated with the respective mission plan, wherein the mission plans having an associated mission score greater than a mission score threshold value are provided to a user.

7. The method of claim 6 further comprising providing the at least one mission plan to the user, ranked in an order based upon the associated mission score for each mission plan.

8. The method of claim 1, further comprising, for each resource:
  if indicated as most optimistic, calculating a minimum possible execution time and/or a minimum possible execution cost, based on the assumed location of the respective resource, the associated radius of uncertainty of the respective resource, and a location of a target involved in the mission; and
  if indicated as least optimistic, calculating a maximum possible execution time and/or a maximum possible execution cost, based on the assumed location of the respective resource, the associated radius of uncertainty of the respective resource, and a location of a target involved in the mission.

9. The method of claim 1 further comprising identifying the obtained information relating to at least one of the resources that includes the uncertainty, and wherein the transforming comprises transforming the identified obtained information.

10. A system comprising a processor and a memory, the memory storing instructions that, when executed, cause the processor to:
  obtain one or more mission goals to be achieved during execution of a mission;
  obtain information relating to one or more resources to be used during execution of the mission, the information including an execution time score indicating a time for the respective resource to execute its part of the mission, an execution cost score indicating a cost for the respective resource to execute its part of the mission, an availability score indicating a level of availability of the respective resource to execute its part of the mission, and an efficiency score indicating a level of efficiency of the respective resource when executing its part of the mission, the information including uncertainty, wherein for each resource, the information relating to a respective resource includes an assumed location of the respective resource, each assumed location having an associated radius of uncertainty, and wherein the processor is to obtain the information relating to the respective resource by deriving at least one of the execution time score or the execution cost score for the respective resource, using the assumed location of the respective resource, and based on an indicated optimism and the respective radius of uncertainty associated with the assumed location of the respective resource;
  obtain user preferences relating to how the uncertainty is to be handled by obtaining from the user the indicated optimism, which is an optimism to be associated with the assumed locations, the user preferences including threshold values relating to the execution cost score, the execution time score, the efficiency score, and the availability score for each respective resource;

transform the information relating to the one or more resources according to the user preferences to reduce the uncertainty in the information by:

transforming the execution cost score for each resource to an absolute indication of cost having two possible values corresponding to whether or not the respective resource is costly by comparing the execution cost score to the cost threshold value;

transforming the execution time score for each resource to an absolute indication of time having two possible values corresponding to whether the respective resource is fast or slow by comparing the execution time score to the time threshold value;

transforming the availability score for each resource to an absolute indication of availability having two possible values corresponding to whether or not the respective resource is available by comparing the availability score to the availability threshold value; and transforming the efficiency score for each resource to an absolute indication of efficiency having two possible values corresponding to whether or not the respective resource is efficient or inefficient by comparing the efficiency score to the efficiency threshold value;

provide the transformed information to a smart process manager, for use by the smart process manager to identify one or more of the resources that are to be used to execute at least one mission step as part of at least one mission plan to achieve the one or more mission goals and accomplish the mission;

update at least one of the assumed location or the radius of uncertainty for at least one resource used in an executed mission step; and provide updated information to the smart process manager to produce a further mission step and/or an updated mission plan based on the updated assumed location and/or radius of uncertainty associated with the assumed location.

11. The system of claim 10, wherein the instructions, when executed, further cause the processor to:

identify, based on the transformed information, the one or more of the resources that are to be used in the at least one mission step as part of the at least one mission plan to accomplish the one or more mission goals;

produce, based on the identified resources, the at least one mission plan to accomplish the one or more mission goals; and provide the at least one mission plan to a user.

12. The system of claim 10, wherein the smart process manager is to identify as useable, to execute the at least one mission step as part of the at least one mission plan, a resource having at least one of an absolute indication of availability indicating that the resource is available, an absolute indication of efficiency indicating that the resource is efficient, an absolute indication of execution cost indicating that the resource is not costly, or an absolute indication of execution time indicating that the resource is not slow.

13. The system of claim 10, wherein the processor is to:

obtain the user preferences by obtaining weighting factors to be applied at least one of the execution time score, the execution cost score, the availability score or the efficiency score; and transform the information relating to the one or more resources by aggregating the execution time score, the execution cost score, the availability score and the efficiency score for each resource as a weighted combination using the weighting factors to provide an overall resource score for each resource, the transformed information comprising the overall resource score for each resource.

14. The system of claim 10, wherein, for each resource, the processor is to:

if indicated as most optimistic, calculate a minimum possible execution time and/or a minimum possible execution cost, based on the assumed location of the respective resource, the associated radius of uncertainty of the respective resource, and a location of a target involved in the mission; and if indicated as least optimistic, calculate a maximum possible execution time and/or a maximum possible execution cost, based on the assumed location of the respective resource, the associated radius of uncertainty of the respective resource, and a location of a target involved in the mission.

* * * * *